US012685407B2

(12) United States Patent
    Johnson

(10) Patent No.:     US 12,685,407 B2
(45) Date of Patent:          Jul. 21, 2026

(54) SYSTEM AND METHOD FOR HEATING FOOD

(71) Applicant: BCC Product Development, L.L.C., Ormond Beach, FL (US)

(72) Inventor: Julianne Johnson, Ormond Beach, FL (US)

(73) Assignee: BCC PRODUCT DEVELOPMENT, L.L.C., Ormond Beach, FL (US)

( * ) Notice: Subject to any disclaimer, the term of this patent is extended or adjusted under 35 U.S.C. 154(b) by 1060 days.

(21) Appl. No.: 17/629,847

(22) PCT Filed: Jul. 29, 2020

(86) PCT No.: PCT/US2020/044020
    § 371 (c)(1),
    (2) Date: Jan. 25, 2022

(87) PCT Pub. No.: WO2021/021899
    PCT Pub. Date: Feb. 4, 2021

(65) Prior Publication Data
    US 2022/0287510 A1     Sep. 15, 2022

Related U.S. Application Data

(60) Provisional application No. 62/879,766, filed on Jul. 29, 2019.

(51) Int. Cl.
    *A47J 37/08*     (2006.01)
    *A47J 36/24*     (2006.01)
    *A47J 37/06*     (2006.01)
(52) U.S. Cl.
    CPC ....... *A47J 37/0885* (2013.01); *A47J 36/2483* (2013.01); *A47J 37/0611* (2013.01)

(58) Field of Classification Search
    CPC . A47J 36/2483; A47J 37/0611; A47J 37/0885
    (Continued)

(56) References Cited

U.S. PATENT DOCUMENTS 2,314,872 A * 3/1943 Dickey ................ A47J 37/0611
                                                     99/372
3,511,170 A   5/1970 O'Connor
                    (Continued)

FOREIGN PATENT DOCUMENTS

AU     2015275269 A1     7/2016
CA     3066327 A1     10/2018
                    (Continued)

OTHER PUBLICATIONS

CIPO Office Action in Chinese App. No. 202080055543.7; dated Jun. 29, 2024; 4 pages.
                    (Continued)

*Primary Examiner* — Steven W Crabb
*Assistant Examiner* — Ket D Dang
(74) *Attorney, Agent, or Firm* — Wolter Van Dyke Davis, PLLC; Robert L. Wolter; Cian O'Brien

(57)          ABSTRACT

A system is provided for heating food. The system includes a housing and a slot, where the slot extends in a direction from the top to the bottom. The system also includes heating elements adjacent the slot. A lever is provided along one of the sides of the housing. The lever is operatively connected to the heating elements and a movable platform within the slot. The system also includes an insert comprising two elements that are rotatable about a hinge from an open position to a closed position. The insert in the closed position defines a recess to hold food. A width of the insert in the closed position is based on a width of the slot. The pair of heating elements are configured to thermally couple with the
                    (Continued)

SYSTEM
100

306a
306b
112
132
110
DRIP TRAY two elements of the insert upon placement of the insert in the slot and actuation of the lever.

18 Claims, 16 Drawing Sheets

(58) Field of Classification Search
 USPC ............................................................ 99/385
 See application file for complete search history.

(56) References Cited

U.S. PATENT DOCUMENTS

| | | | |
|---|---|---|---|
| 3,524,404 A | 8/1970 | Kimora et al. | |
| 3,794,952 A | 2/1974 | Dowis | |
| 3,831,508 A * | 8/1974 | Wallard | A47G 19/28 |
| | | | 220/573.1 |
| 4,129,067 A | 12/1978 | Reiland | |
| 4,184,419 A | 1/1980 | Ponte | |
| 4,290,349 A * | 9/1981 | Fiorenza | A47J 37/0885 |
| | | | 16/361 |
| 4,862,791 A * | 9/1989 | Baughey | H05B 6/6408 |
| | | | 426/107 |
| 5,228,381 A | 7/1993 | Virgilio et al. | |
| 5,299,492 A * | 4/1994 | Carbon | A21B 5/023 |
| | | | 99/380 |
| 5,937,742 A * | 8/1999 | Steeb | A47J 37/0611 |
| | | | 99/380 |
| 6,257,126 B1 * | 7/2001 | Veljkovic | A47J 37/0611 |
| | | | 99/372 |
| 10,368,693 B2 * | 8/2019 | Branch | A47J 37/085 |
| 2005/0142911 A1 | 6/2005 | Khoury | |
| 2008/0173185 A1 | 7/2008 | Lam | |
| 2009/0049993 A1 | 2/2009 | Morgan | |
| 2010/0180776 A1 * | 7/2010 | Lin | A47J 37/0623 |
| | | | 99/422 |
| 2014/0178552 A1 * | 6/2014 | Walker | A47J 37/0871 |
| | | | 426/520 |
| 2014/0196611 A1 * | 7/2014 | Reinhart | A21B 3/132 |
| | | | 220/573.1 |
| 2014/0352549 A1 | 12/2014 | Upston et al. | |
| 2016/0309957 A1 * | 10/2016 | Bart | A47J 37/0611 |
| 2017/0231423 A1 * | 8/2017 | Reales Bertomeo | A47J 37/06 |
| | | | 99/339 |
| 2017/0303742 A1 | 10/2017 | Gallego, II | |
| 2020/0405087 A1 * | 12/2020 | Pool, III | A47J 37/01 |

FOREIGN PATENT DOCUMENTS

| | | | |
|---|---|---|---|
| CN | 201119795 Y | 9/2008 | |
| CN | 105193292 A | 12/2015 | |
| CN | 206295283 U | 7/2017 | |
| JP | S56163611 A | 12/1981 | |
| JP | S56173129 | 12/1981 | |
| JP | H08080261 A | 3/1996 | |
| KR | 101124661 B1 * | 3/2012 | |
| KR | 101589648 B1 | 2/2016 | |
| WO | 1997048318 A1 | 12/1997 | |

OTHER PUBLICATIONS

EP20846515.3 Extended European Search Report, dated Jul. 25, 2023, 8 pages.
PCT/US2020/044020 International Search Report and Written Opinion, dated Nov. 19, 2020, 12 pages.
JPO Office Action in Japanese App. No. 2022-505408; dated Jul. 16, 2024; 4 pages.
Office Action issued in corresponding Korean Patent Application No. 10-2022-7004336, 15 pages, dated Aug. 6, 2025.
Office Action issued in corresponding European Patent Application No. 20846515.3, 7 pages, dated Mar. 17, 2026.
Decision of Allowance issued in corresponding Korean Patent Application No. 10-2022-7004336, 5 pages, dated Apr. 1, 2026.

* cited by examiner

SYSTEM
*100*

HOUSING
*101*

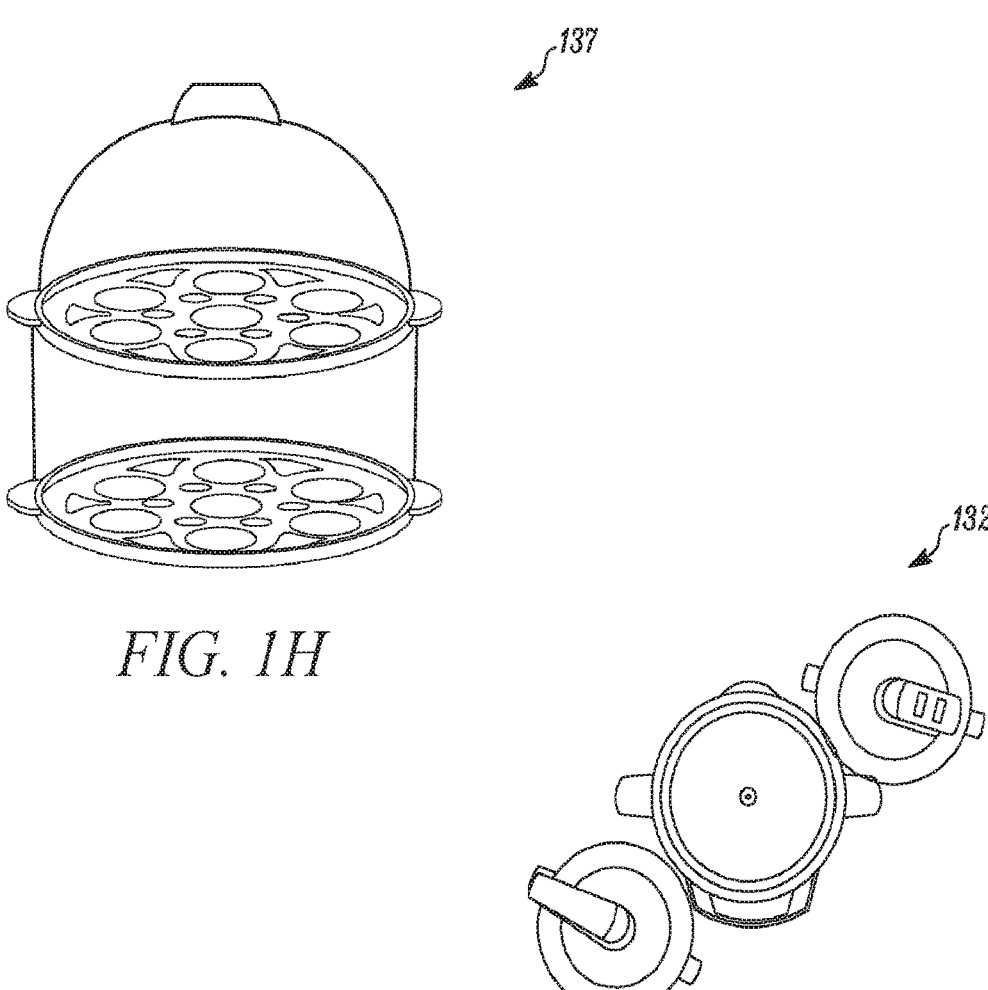
*FIG. 1H*
*137*
*132*
*FIG. 1I*
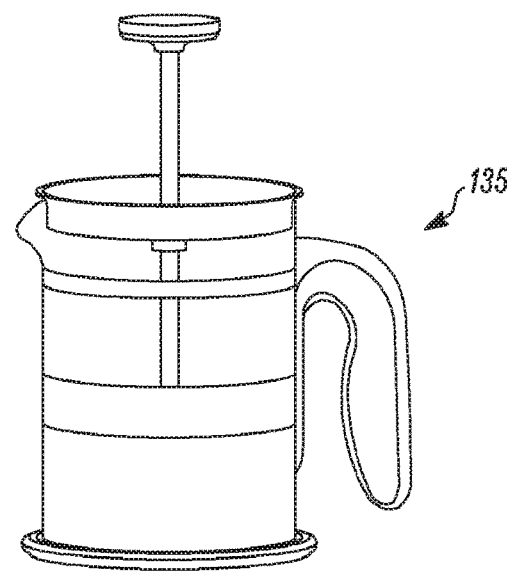
*135*
*FIG. 1J*

135

137

INSERT
*308*

PARTITIONS
*326*

PARTITIONED
REGION
*327*

CLIP
*320*

*330*

*332*

WIDTH
*321*

OPENING
330'

INSERT
309

BASIC WARNING
INSERT

_____

DOES NOT HAVE
A HINGE

320
CLIP

HINGE
332

WAFFLE INSERT

& FILL ACCESSORY

HINGE
312

INSERT
313

INSERT
300'

SYSTEM AND METHOD FOR HEATING FOOD

CROSS REFERENCE TO RELATED APPLICATIONS

This application claims benefit of Provisional Application No. 62/879,766, filed Jul. 29, 2019, the entire contents of which is hereby incorporated by reference as if fully set forth herein, under 35 U.S.C. § 119(e).

BACKGROUND

Conventional systems are available for heating food, such as a Panini Press® or George Foreman® grill. These systems typically feature a pair of heating elements made from a non-stick steel surface that are rotatably connected at a hinge. These conventional systems also feature an electrical cord to connect the system to an electrical outlet to provide power to the heating elements. Food such as sandwiches is placed between the pair of heating elements in an open position and the heating elements are then rotated from the open position to a closed position. The heating elements are then activated so that the temperature of the heating elements increases to heat the food positioned between the heating elements. These systems also typically orient the heating elements at an angle relative to a surface on which the system is positioned so that oil formed during the cooking flows down off the heating elements.

SUMMARY

Techniques are provided for an improved system and method for heating food. The inventor noted that conventional systems for heating food, such as the Panini Press® or George Foreman® grill have several shortcomings. For example, these conventional systems are bulky and cumbersome and thus require a significant amount of effort to operate and clean after use. Additionally, since these conventional systems feature an electrical cord that is connected to an electrical outlet, this provides a possible safety hazard when the system is being cleaned. Thus, the inventor of the present invention developed the system and method described herein which provides a system that is versatile and much easier to clean than the conventional systems discussed above.

Additionally, the inventor recognized that while these conventional systems can be used to heat certain types of food (e.g. sandwiches, chicken breast, etc.) they cannot be used to heat other types of food (e.g. omelets, cakes, general leftovers, etc.). Accordingly, the inventor of the present invention noticed that users typically have to include several other appliances in the kitchen in order to heat or cook these other types of food. Thus, the inventor of the present invention developed the system and method described herein which provides a single system that can heat a wide range of food beyond that heated by each individual conventional system discussed above.

Additionally, the inventor recognized that while these conventional systems can be used to heat certain types of food (e.g. sandwiches, chicken breast, etc.) they cannot simultaneously prepare other complimentary side dishes that are typically consumed with these types of food (e.g. soup, syrup, hardboiled egg, etc.). Thus, the inventor of the present invention developed the system and method described herein which provides a system that can simultaneously heat certain types of food (e.g. sandwiches, chicken breast) and other complimentary side dishes that can be consumed with these types of food (e.g. soup, syrup, hardboiled egg, etc.).

In a first embodiment, an insert is provided for cooking food. In an embodiment, the insert includes a pair of elements that are rotatable about a hinge from an open position to a closed position. The insert in the closed position defines a recess to hold food and wherein a width of the insert in the closed position is based on a width of a slot in a heating device such that the insert in the closed position is configured to thermally engage heating elements of the heating device when placed in the slot.

In a second embodiment, a system is provided for heating food. The system includes a housing with a top, a bottom, and a pair of opposite sides. The system also includes at least one slot defined by the housing, where the at least one slot extends in a direction from the top to the bottom (e.g. vertical direction). The system also includes a pair of heating elements adjacent the at least one slot. The system also includes an insert comprising two elements that are rotatable about a hinge from an open position to a closed position. The insert in the closed position defines a recess to hold food. A width of the insert in the closed position is based on a width of the at least one slot. The pair of heating elements are configured to thermally couple with the two elements of the insert upon placement of the insert in the at least slot.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 1H is an image that illustrates an example of a side view of a container to steam eggs using the system of FIG. 1A, according to an embodiment;

FIG. 1I is an image that illustrates an example of a side view of a container to mix ingredients using the system of FIG. 1A, according to an embodiment;

FIG. 1J is an image that illustrates an example of a side view of a container to hold a steamed beverage using the system of FIG. 1A, according to an embodiment;

FIG. 3I is an image that illustrates an example of a top perspective view of the fourth insert of FIG. 3B in an open position, according to an embodiment;

DETAILED DESCRIPTION

Figure 1A:
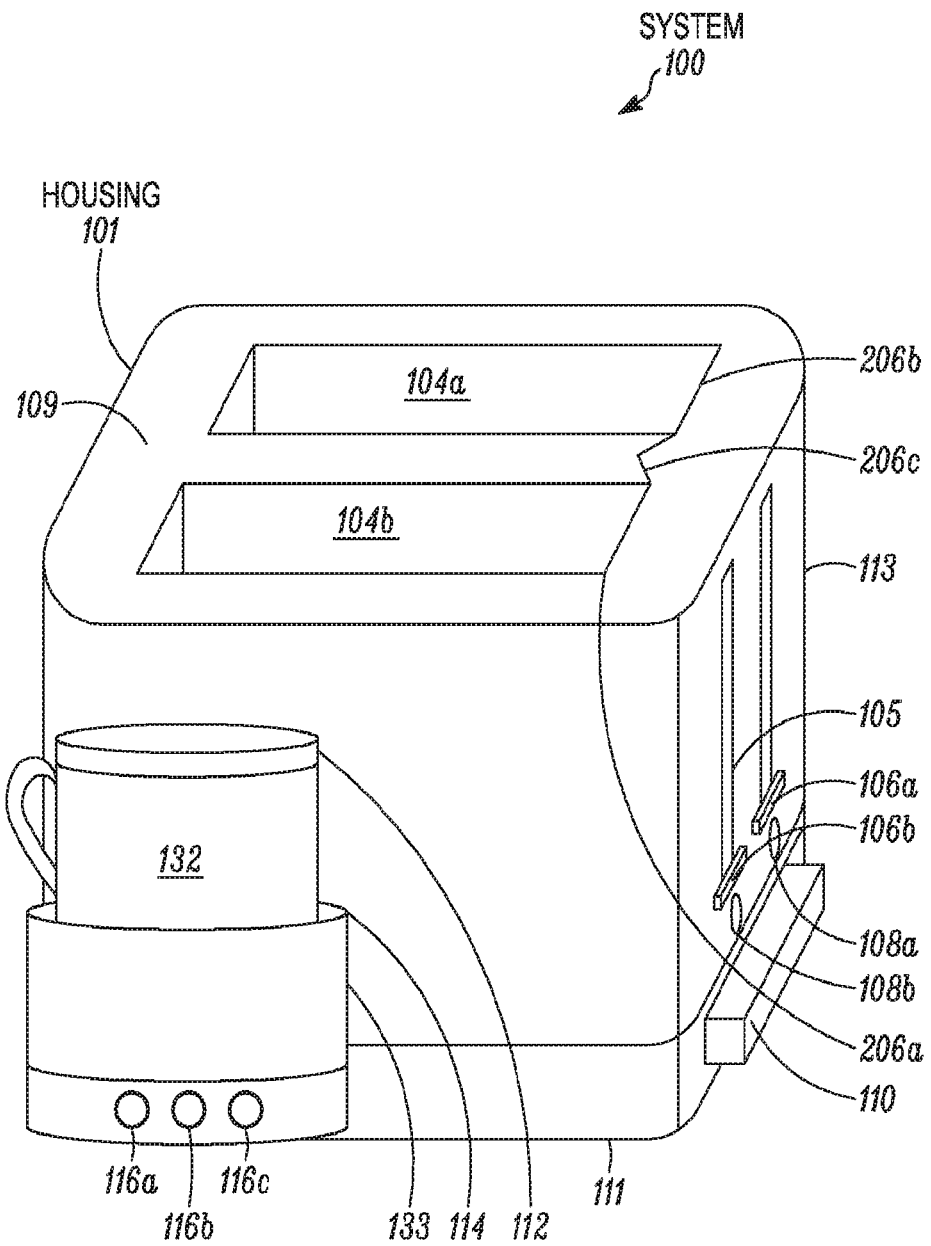
FIG. 1A is an image that illustrates an example of a top perspective view of a system for heating food, according to an embodiment.

A method and system are described for heating food. For purposes of this description, "heating food" is defined to mean reheating cooked food or heating food (e.g. uncooked food) to a point where the food is cooked (e.g. the food is at a temperature where it is safe for human consumption). In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of heating and/or cooking food, e.g. grilling sandwiches, grilling meat (e.g. chicken, steak, sausages, etc.), making omelets, baking cakes, making waffles, heating leftovers or generally heating any food before consuming. In other embodiments, the invention is described below in the context of mixing ingredients for heating or cooking food (e.g. mixing omelet ingredients, mixing cake batter, etc.). In still other embodiments, the invention is described below in the context of heating and/or mixing liquid based food (e.g. soup, broth, coffee, tea, syrup, etc.) and/or to provide food (e.g. hardboiled egg, fried egg, etc.) to compliment other food being heated with the system (e.g. grilled sandwich, etc.).

Figure 1B:
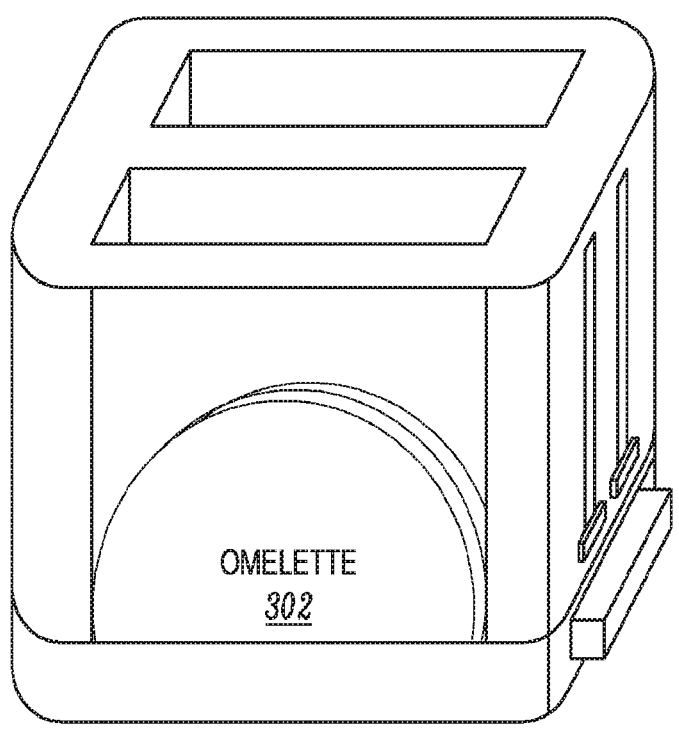
FIG. 1B is an image that illustrates an example of sectional view of the system for heating food of FIG. 1A with a first insert within the slot, according to an embodiment.
Figure 1C:
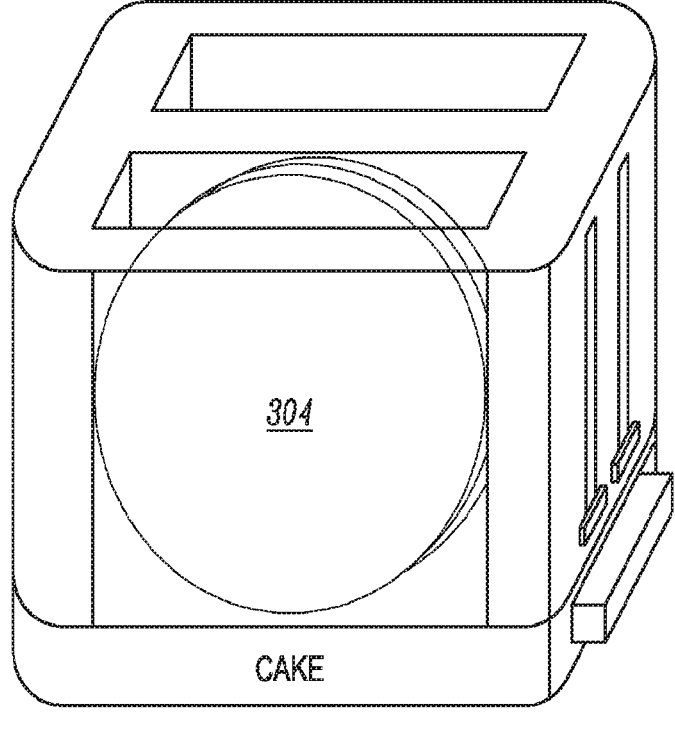
FIG. 1C is an image that illustrates an example of a sectional view of the system for heating food of FIG. 1A with a second insert within the slot, according to an embodiment.

FIGS. 1A-1C are images that illustrate an example of a perspective view of a system 100 for heating food. In an embodiment, the system 100 includes a housing 101 that resembles a toaster with a top 109, a bottom 111, and a pair of opposite sides 113. In an example embodiment, a length of the housing 101 is about 9-10" or in a range from about 7" to about 12". In one embodiment, the housing 101 defines a pair of slots 104a, 104b which each extend in a direction from the top 109 to the bottom 111. In an example embodiment, the slots 104 have a length of about 6" or in a range from about 4" to about 8" and/or a width of about 1.5" or in a range from about 0.5" to about 3". Although FIG. 1A depicts a pair of slots 104a, 104b, in other embodiments only one slot or more than two slots may be provided. In an example embodiment, a removable drip tray 110 is positioned in a slot adjacent a bottom 111 of the housing 101.

The removably drip tray 110 can be removed (e.g. slidably removed from a slot defined by the bottom 111 of the housing 101) and cleaned. Although FIG. 1A depicts a rectangular housing 101, in other embodiments the housing can take any shape such as an oval shape, a round shape or any polygon shape other than rectangular, provided that it defines the slots and the other features discussed herein.

Figures 1D, 1E:
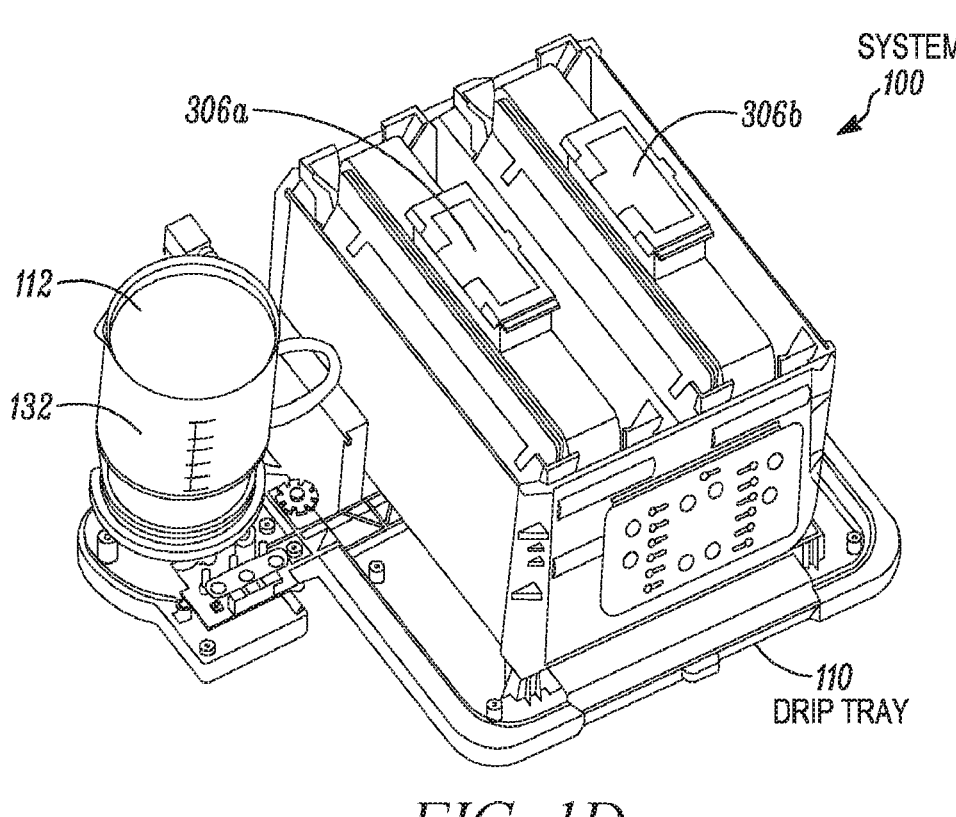
FIG. 1D is an image that illustrates an example of a top perspective view of the system of FIG. 1A with the housing removed.
FIG. 1E is an image that illustrates an example of a top perspective view of the system of FIG. 1A, according to an embodiment.
Figure 1F:
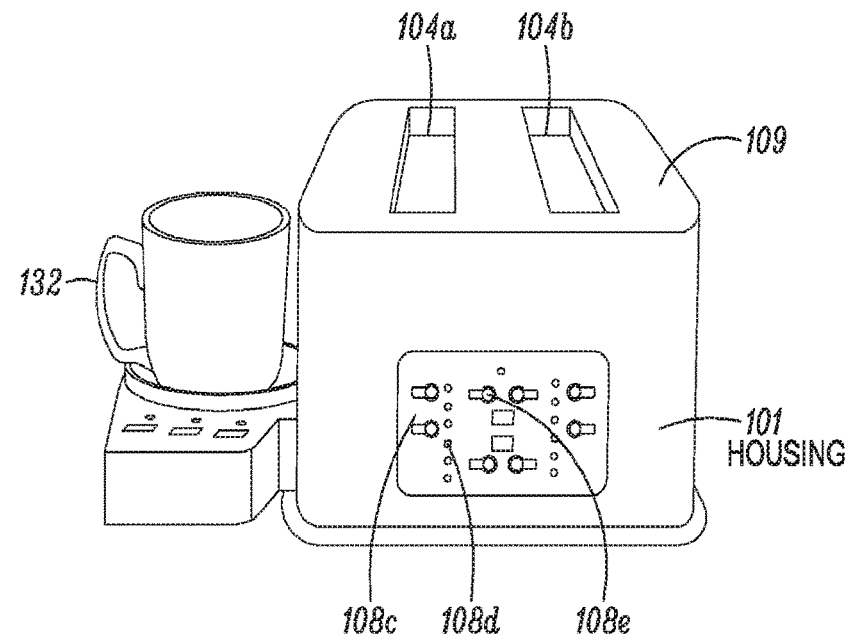
FIG. 1F is an image that illustrates an example of a side view of the system of FIG. 1A, according to an embodiment.

FIG. 1D is an image that illustrates an example of a top perspective view of the system 100 of FIG. 1A with the housing 101 removed. In an embodiment, FIG. 1D depicts two inserts 306a, 306b positioned within the respective slots 104a, 104b of the housing 101. Additionally, in one embodiment, FIG. 1D depicts the drip tray 110 (e.g. in the position within the housing 101 to collect oil or grease during the cooking of food within the inserts). FIG. 1E is an image that illustrates an example of a top perspective view of the system 100 of FIG. 1D, according to an embodiment. The system 100 of FIG. 1E includes the housing 101. FIG. 1F also depicts an image that illustrates an example of a side view of the system of FIG. 1D with the housing 101.

Figure 1G:
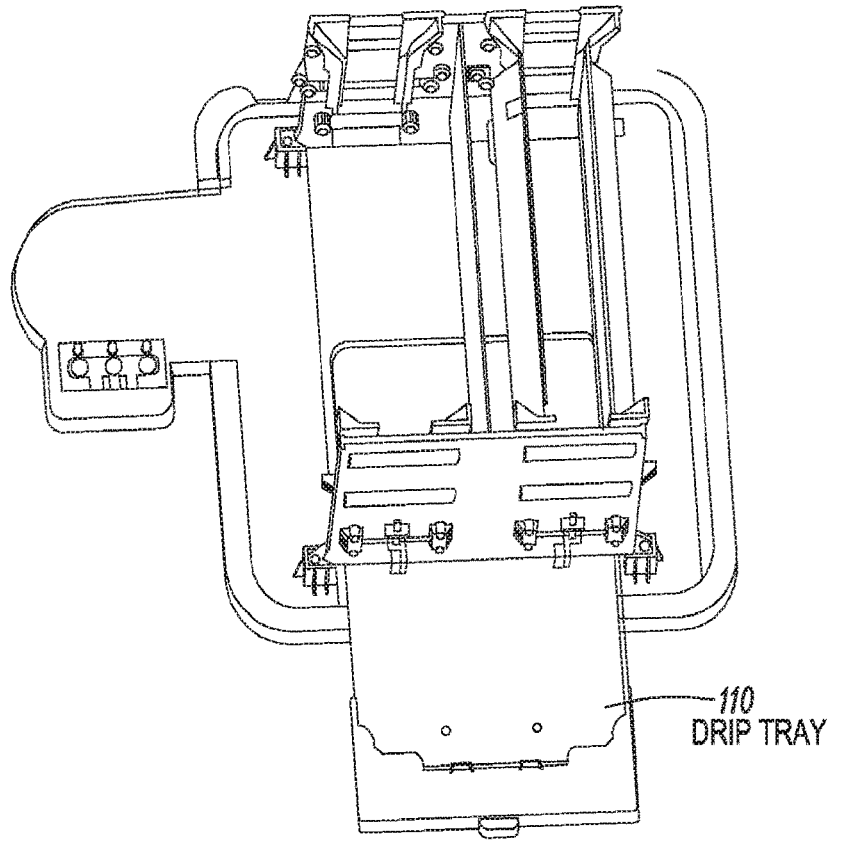
FIG. 1G is an image that illustrates an example of a top perspective view of the system of FIG. 1A with the drip tray being removed, according to an embodiment.

FIG. 1G is an image that illustrates an example of a top perspective view of the system 100 of FIG. 1A with the drip tray 110 being removed, according to an embodiment. In one embodiment, after one or more uses of the system, the drip tray 110 can be slid out from beneath the slots 104a, 104b and can be manually washed and/or placed in a dishwasher (dishwasher safe). This advantageously eases the cleaning of the system, between one or more uses and enhances a safety of the system, since the user does not need to bring electrical components (e.g. cables that connect the system to an electrical outlet) within close proximity of water.

Figure 2:
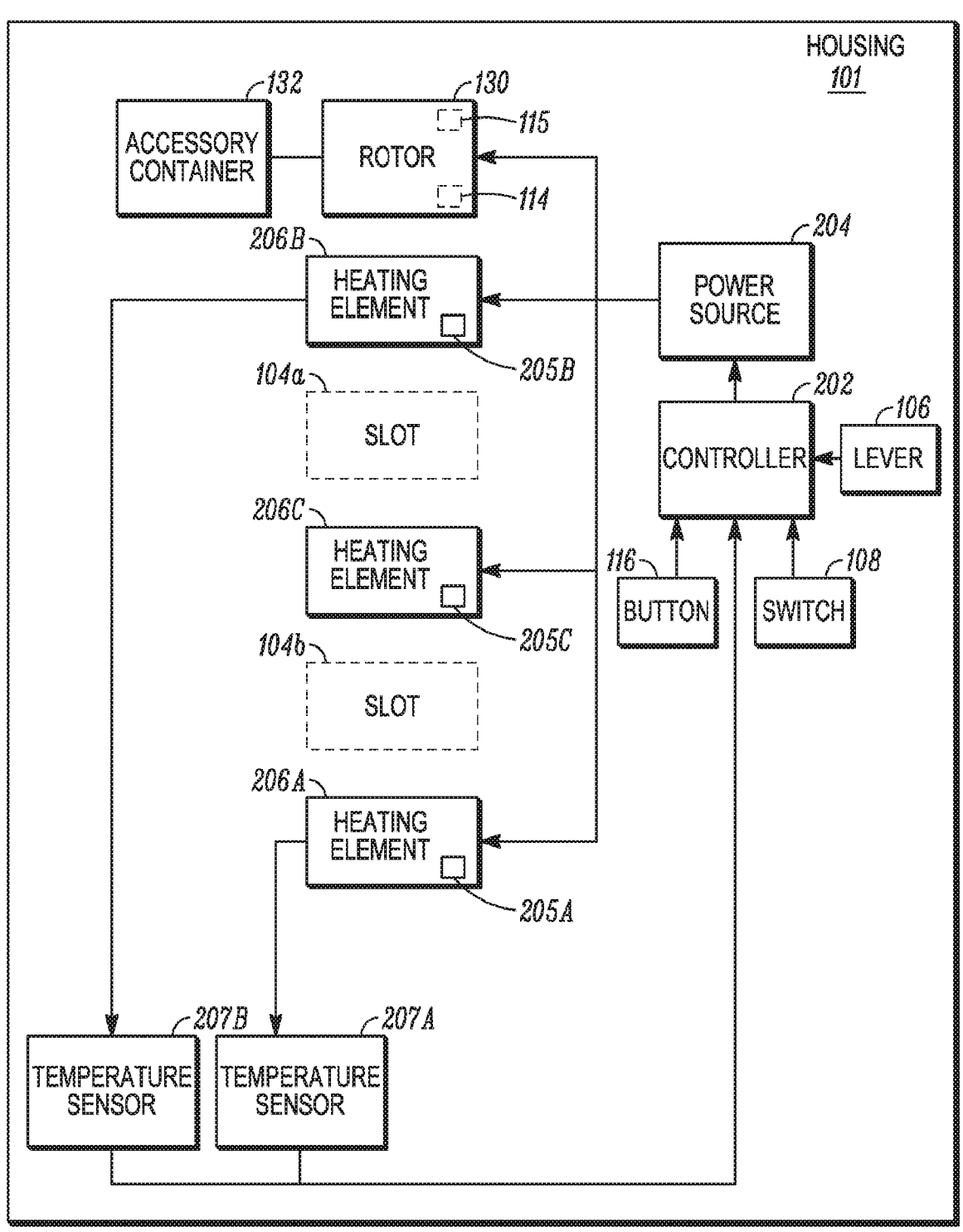
FIG. 2 is a block diagram that illustrates an example of the system for heating food of FIG. 1A, according to an embodiment.

FIG. 2 is a block diagram that illustrates an example of the system 100 for heating food of FIG. 1A, according to an embodiment. In an embodiment, a first pair of heating elements 206b, 206c are adjacent to the first slot 104a and a second pair of heating elements 206a, 206c are adjacent to the second slot 104b. In an example embodiment, as depicted in FIG. 2, the first pair of heating elements 206b, 206c and the second pair of heating elements 206a, 206c include a shared heating element 206c positioned between the first and second slots 104a, 104b. In other embodiments, no shared heating element 206c is provided and instead each slot has a respective pair of heating elements. In an example embodiment, each heating element 206a, 206b, 206c includes a respective heat source 205a, 205b, 205c and a heating surface thermally coupled with the heat source 205 and defining an inner surface of the respective slot 104. In this example embodiment, the heating surfaces of the heating elements 206b, 206c define the inner surfaces along a width of the slot 104a and/or the heating surfaces of the heating elements 206a, 206c define the inner surfaces along a width of the slot 104b. In an example embodiment, the heating surface of the heating element 206 is a non-stick thermally conductive material (e.g. stainless steel, Teflon® coated material, etc.) and/or a similar material used in the heating surfaces of the Panini Press® or George Foreman® grill and/or is grooved.

Figures 3A, 3B:
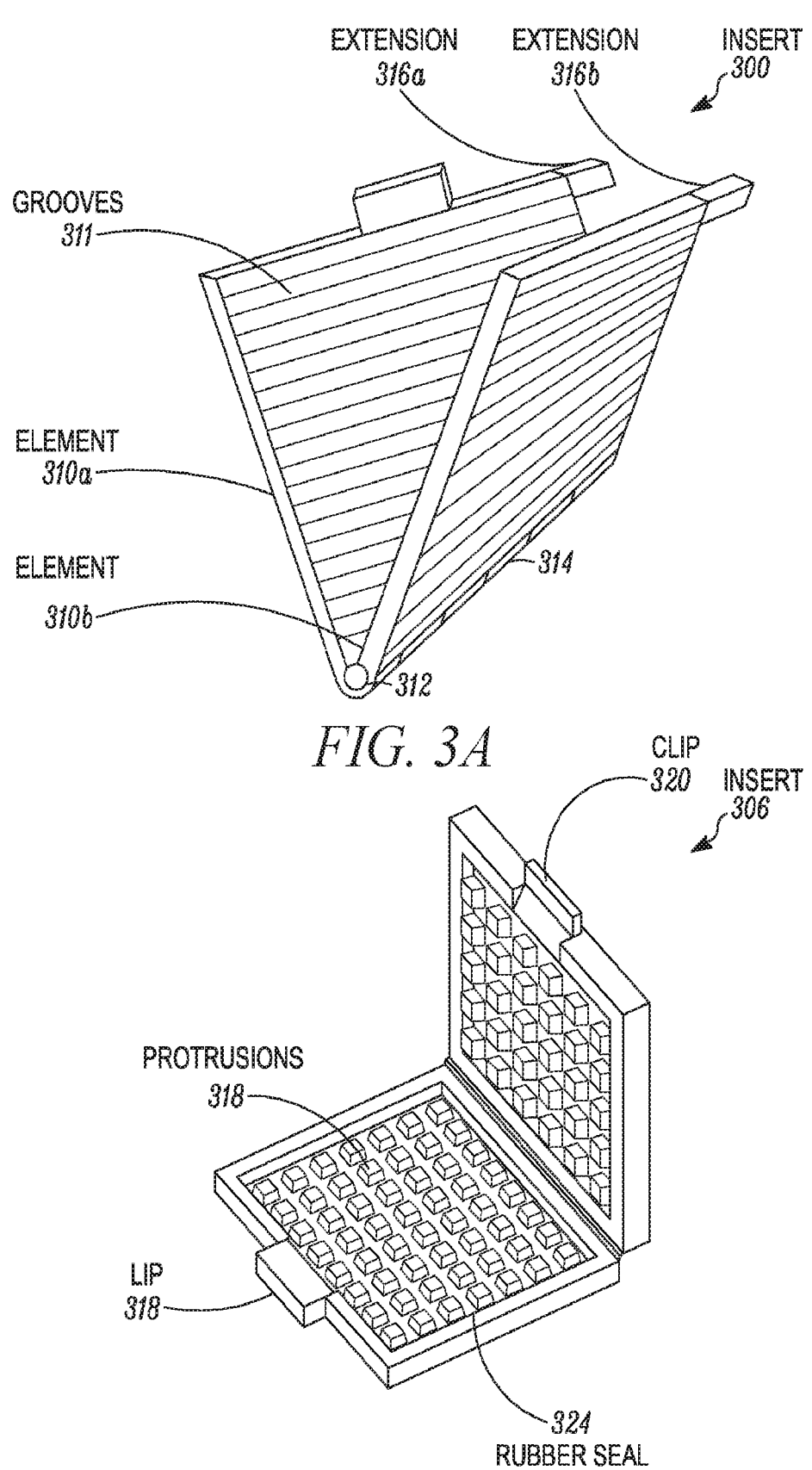
FIG. 3A is an image that illustrates an example of a side perspective view of a third insert to be used in the system of FIG. 1A, according to an embodiment.
FIG. 3B is an image that illustrates an example of a side perspective view of a fourth insert to be used in the system of FIG. 1A, according to an embodiment.
Figure 3C:
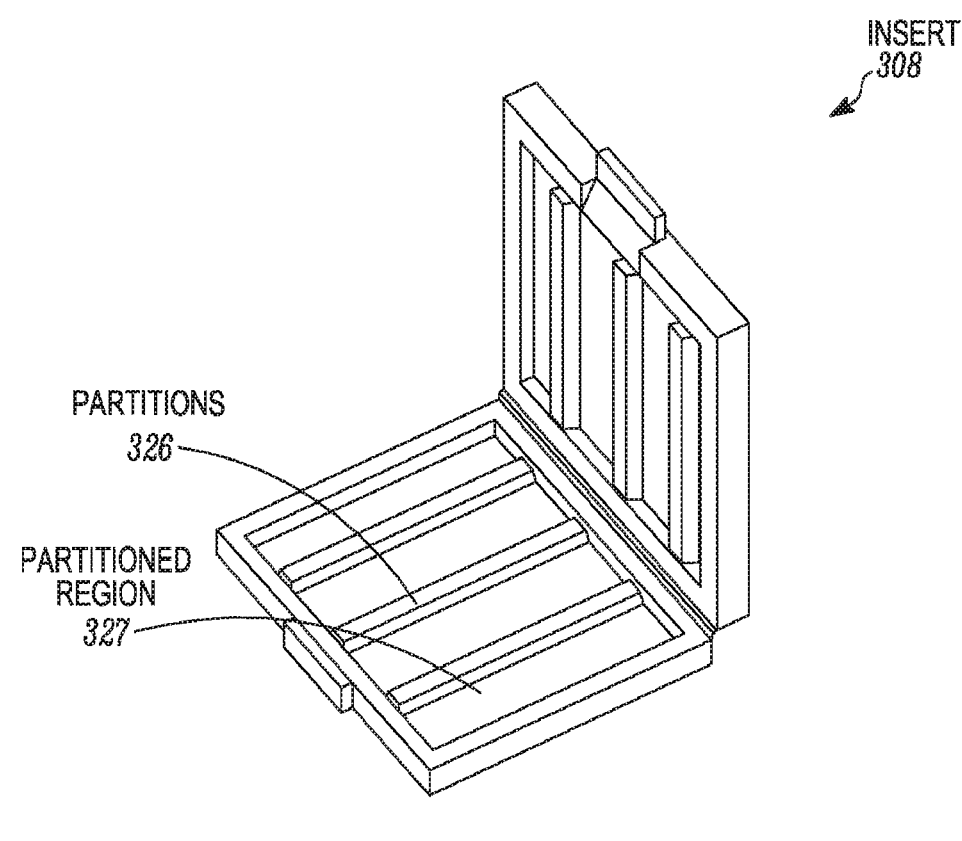
FIG. 3C is an image that illustrates an example of a side perspective view of a fifth insert to be used in the system of FIG. 1A, according to an embodiment.
Figure 3D:
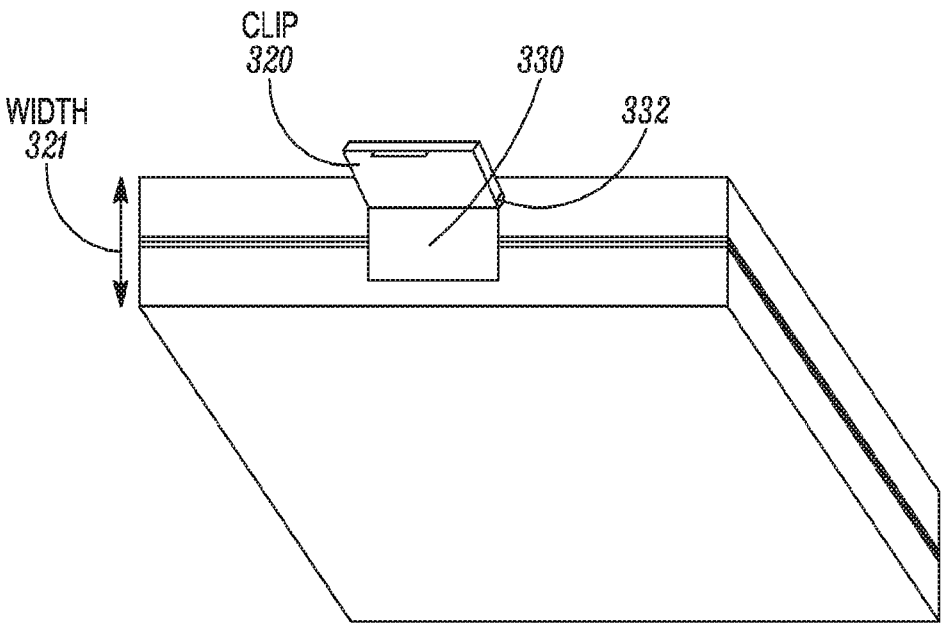
FIG. 3D is an image that illustrates an example of a top perspective view of an opening of the fourth insert to be used in the system of FIG. 1A, according to an embodiment.

FIG. 3A is an image that illustrates an example of a side perspective view of an insert 300 to be used in the system 100 of FIG. 1A, according to an embodiment. In an embodiment, the insert 300 includes two elements 310a, 310b that are rotatable about a hinge 312 from an open position (FIG. 3A) to a closed position (FIG. 3D). In an embodiment, the elements 310a, 310b are made from a similar material as the heating elements 206. In an example embodiment, the elements 310a, 310b are made from non-stick thermally conductive material (e.g. stainless steel, Teflon® coated material, etc.) and/or similar material used in the heating surfaces of the Panini Press® or George Foreman® grill and/or includes grooves 311. In an example embodiment, in the closed position the insert 300 defines a recess (not shown in FIG. 3A) between the inner surfaces of the elements 310a, 310b to hold food. In the example embodiment of the insert 300 of FIG. 3A, the recess of the insert 300 in the closed position is to hold food such as a sandwich and/or meat (e.g. chicken breast, steak, etc.). In an embodiment, a width of the insert 300 in the closed position (e.g. width 321 of the insert 300 in FIG. 3D) is sized based on the width of the slot 104, so that the insert 300 is thermally coupled and/or thermally engaged with the heating elements 206 when the insert 300 is positioned in the slot 104. In one example embodiment, the width 321 of the insert 300 in the closed position is sized to be about equal (e.g. within about ±10%) of the width of the slot 104, so that the insert 300 in the closed position achieves a secure fit within the slot 104. In an example embodiment, the width 321 of the insert 300 in the closed position is not too low (e.g. relative to the width of the slot 104) so that the outer surface of the elements 310 are not thermally coupled and/or thermally engaged with the heating elements 206 while at the same time the width of the insert 300 in the closed position is not too high (e.g. relative to the width of the slot 104) so that the insert 300 will not fit into the slot 104. In some embodiments, positioning food within the recess may affect (e.g. enlarge) the width 321 of the insert 300 in the closed position and thus in these embodiments, the width of the insert 300 (with the food inserted in the recess) is used to ensure that the width 321 is about equal to the width of the slot 104.

In some embodiments, a pair of levers 106a, 106b are provided along the side 113 of the housing 101 and are operatively connected to a movable platform (not shown) within each slot 104a, 104b. The pair of levers 106a, 106b are slidably received within a pair of respective slits 105 along the side 113 of the housing 101. In other embodiments, the levers 106 and slits 105 are omitted and the insert is manually positioned into the slot and manually removed from the slot. In these embodiments, the slot does not feature a movable platform. In still other embodiments, a movable platform is moved within the slot 104 using means other than levers (e.g. electronic means, such as a button or input device on a side of the housing that transmits a signal to a motor to raise/lower the movable platform). In still other embodiments, there is no movable platform within the slot 104 and instead the insert is positioned within the slot 104 such that the insert does not move (e.g. up and down) before, during and after the heating/cooking of the food within the insert. In this embodiment, a height of the slot is based on a height of the insert (e.g. within ±10% of each other).

To commence heating food in one of the slots 104, in some embodiments the insert 300 (e.g. containing the food) is positioned in the slot 104 and the lever 106 associated with the slot 104 is moved down in the slit 105 to a bottom position. In other embodiments, the insert 300 is positioned in the slot 104 and no levers are provided since the insert 300 is heated at the same height that it is positioned in the slot 104. In other embodiments, the insert 300 is positioned in the slot 104 and is filled with food after the insert 300 is heated in the slot 104. In another embodiment, a pair of switches 108a, 108b are provided along the side 113 of the housing 101. The switch 108 features multiple time and temperature settings and the switch 108 is adjusted to correspond to one of the time and temperature settings. In an embodiment, each time and temperature setting corresponds to heating the heating elements 206 to a specific temperature for a specific time. In one example embodiment, a first time and temperature setting is provided for certain types of food in the insert 300 (e.g. chicken breast, steak, etc.), a second time and temperature setting is provided for other types of food in the insert 300 (e.g. grilled sandwiches) and a third time and temperature setting is provided for other types of food in the insert 300 (e.g. omelets, cakes, etc.).

In an embodiment, as depicted in FIG. 1F, in some embodiments the side 113 of the housing 101 features one or more buttons that accommodate a user selecting a cooking mode based on the type of food to be positioned within the insert. In one embodiment, the side 113 includes a pair of buttons 108c that include one button 108c to turn the heating elements on for a particular slot and another button 108c to select a mode of heating/cooking which is indicated by one of a light indicator 108d that is illuminated (e.g. Toast, Grill, Panini, Omelet, Waffle & Bake options). Thus, in one example embodiment, the user selects the mode (based on the type of food being cooked) by pressing the button 108c so that the system toggles through each of the modes using the light indicators 108d (e.g. each successive light indicator 108d corresponding to each of the cooking option is illuminated as the button 108c is pressed). In other embodiments, any arrangement of buttons (e.g. a respective button for each cooking mode) could be used that permits the user to select the appropriate cooking/heating mode, based on the type of food positioned within the insert. Thus, in an example embodiment, if the user wants to cook an omelet in the insert, the user presses the button 108c four times until the omelet light indicator 108d is illuminated. The system advantageously heats the insert automatically using the heating elements for a predetermined time (e.g. stored in a memory of the controller 202 for each mode), based on the selected mode. This advantageously simplifies the cooking process so that the user does not need to track the cooking time and temperature. Instead, the user only needs to select the appropriate mode based on the type of food being cooked in the insert.

Additionally, in an embodiment, two buttons 108e are provided which can be used to manually adjust the cooking time of the food in the insert (e.g. one button 108e to increase the cooking time and another button 108e to decrease the cooking time). In an example embodiment, the adjusted time (e.g. using the buttons 108e) is presented on a display adjacent to the buttons 108e. This advantageously permits the user to manually override the selection of the cooking mode (e.g. using the buttons 108c and indicator 108d, with predetermined cooking time for each food type) and manually select a desired cooking time. In one example embodiment, the levers 106 and slits 105 are not necessary in the system of FIG. 1F, since the insert has a dimension (e.g. height) based on a dimension (e.g. height) of the slot 104 and no movable platform is provided within the slot, so that the insert does not need to be moved up/down during or after the cooking process. This advantageously simplifies the structural features of the system 100, as compared with conventional toaster devices.

In an embodiment, as depicted in FIG. 2. the system 100 includes thermostat or temperature sensors 207a, 207b to measure a temperature of the heating elements 206a, 206b. In one embodiment, the temperature sensors 207a, 207b measure the temperature of the heating elements 206a, 206b other than the shared heating element 206c positioned between the slots 104a, 104b. In other embodiments, a temperature sensor is provided for each heating element. In an embodiment, the system 100 also includes a power source 204 and a controller 202 operatively coupled to the power source 204, the levers 106a, 106b, the switches 108a, 108b, the temperature sensors 207a, 207b and the heating elements 206a, 206b, 206c. In another embodiment, the power source 204 is operatively coupled to the buttons 108c and 108e and the levers are omitted.

In one example embodiment, food is placed in the insert 300 and the insert 300 is positioned in the slot 104a and thermally engages the heating elements 206b, 206c. In some embodiments, when the first lever 106a is actuated and the first switch 108a is moved to a first time and temperature setting, a signal is transmitted to the controller 202 indicating that the first lever 106a (e.g. corresponding to the slot 104a) is actuated and that the first time and temperature setting is selected by the switch 108a. In other embodiments, no levers 106 are provided and the insert is placed in the slot such that the insert need not be moved up/down within the slot (e.g. insert height is about equal to the slot height, no movable platform, etc.) and in this embodiment a sensor (not shown) detects the presence of the insert within the slot and transmits a signal to the controller 202 to confirm the presence of the insert within the slot.

In this example embodiment, the controller 202 then transmits a first signal the power source 204 to deliver power to the heating elements 206b, 206c to cause the temperature of the heating elements 206b, 206c to increase to a first temperature (e.g. where the first temperature is obtained from the first time and temperature setting and/or where the first temperature is a same temperature used for each of the cooking modes (e.g. indicated by the button 108c and at which the cooking time varies among the cooking modes). In some embodiments, the memory of the controller 202 has a respective first/desired temperature value stored for each of the cooking modes and upon a user selecting one of the cooking modes (e.g. using buttons 108c and indicator 108d) the respective desired temperature for the selected mode is retrieved from the memory of the controller 202 and used to heat the heating elements 206. In yet another embodiment, a sensor (not shown) detects the presence of the insert within the slot and transmits a signal to the controller 202 upon detecting the presence of the insert within the slot. In this embodiment, the controller 202 only transmits a signal to the power source 202 to deliver power to the heating elements upon receiving the signal from the sensor indicating that the insert is within the slot. The inventor noted that this advantageously provides a safety feature which ensures that the heating elements cannot be heated unless the insert is present within the slot.

In this embodiment, the temperature sensor 207b is configured to transmit data indicating the temperature of the heating element 206b to the controller 202, as the heating element 206b temperature increases to the first temperature. The controller 202 is configured to determine when the temperature of the heating element 206b reaches the first temperature. When the controller 202 makes this determination, the controller 202 starts a clock to determine an elapse of the first time (e.g. obtained from the first time and temperature setting or from a memory of the controller 202 based on the selected cooking mode using the buttons 108c) and simultaneously transmits a second signal to the power source 204 to stop delivering power to the heating element 206b. Upon determining that the temperature of the heating element 206b falls below the first temperature, the controller 202 re-transmits the first signal to the power source 204 to reheat the heating element 206b to the first temperature. The controller 202 repeats this pattern over the first time to maintain the temperature of the heating element 206b at the first temperature over the first time. Upon an elapse of the first time, the controller 202 transmits the second signal to the power source 204 to turn off the heating element 206b. In some embodiments, the controller 202 further transmits a signal to the lever 106 to cause the lever 106 and movable platform to rise in the slot 104, thereby causing the insert 300 (on the movable platform) to rise in the slot 104. In other embodiments, no levers 106 are provided and the controller 202 automatically transmits a signal to a motor (not shown) to automatically move the movable platform to rise in the slot 104, thereby causing the insert 300 to rise in the slot 104 or the user presses one of the buttons 108e to cause the insert to rise in the slot 104 (e.g. transmits a signal to a motor to cause the insert to rise within the slot). In still other embodiments, no levers 106 are provided and no movable platform is positioned within the slot 104 and instead the insert does not move vertically during the process (e.g. user removes the insert from the slot at the same position as where the food within the insert was heated/cooked). In other embodiments, an insert can be positioned in both slots 104a, 104b and the controller 202 simultaneously monitors the temperature of the heating elements 206a, 206b based on the time and temperature setting of the switches 108a, 108b (or the time stored in the memory based on the selected mode using buttons 108c-108d) in a similar manner as discussed above.

FIG. 3D is an image that illustrates an example of a top perspective view of an opening 330 of an insert 306 to be used in the system 100 of FIG. 1A, according to an embodiment. In an embodiment, the insert 306 of FIG. 3D is in the closed position and defines an opening 330 in a top of the insert 306 opposite from a bottom of the insert 300 where the hinge 312 (FIGS. 3A, 3F) is provided. The top of the insert 306 is defined as the surface of the insert 306 opposite from the hinge 312 and/or most proximate to the top 109 of the housing 101 and/or the bottom of the insert 306 is defined as the surface of the insert 306 that defines the hinge 312 and/or most proximate to the bottom 111 of the housing 101 when the insert 300 is positioned in the slot 104. In an embodiment, the opening 330 is in an external surface of the top of the insert 306 and is continuous with the recess within the insert 306 in the closed position. In another embodiment, opening 330 is defined by a surface of each element 310a, 310b when the insert 306 is moved to the closed position. In an example embodiment, the opening 330 is provided for placement of food (e.g. pouring liquid mix, placing solid food, etc.) through the opening 330 and into the recess when the insert 306 is in the closed position. In another example embodiment, as depicted in FIG. 3D a clip 320 is provided that is rotatable about a second hinge 332 at the external surface of the insert 306 adjacent to the opening 330. In an example embodiment, the clip 320 is rotatable from an open position (e.g. where food is passed through the opening 330) to a closed position which closes the opening 330 and/or is affixed to a lip 318 (FIG. 3B) to hold the elements 310a, 310b together and thus holds the insert 300 in the closed position. In an example embodiment, the clip 320 is rotated to the closed position during the heating of the food in the insert 306 in the slot 104 of the system 100.

FIG. 3B is an image that illustrates an example of a side perspective view of an insert 306 to be used in the system 100 of FIG. 1A, according to an embodiment. In an embodiment, the insert 306 includes a seal 324 (e.g. rubber seal) around a perimeter of each of the two elements 310. In one embodiment, the seal 324 provides an air-tight seal so that food cannot leak or escape from the recess of the insert 306 when the insert 306 is in the closed position. In an example embodiment, the seal 324 is made from silicon and/or rubber material.

FIG. 3A is an image that illustrates an example of a side perspective view of an insert 300 to be used in the system 100 of FIG. 1A, according to an embodiment. In an embodiment, the insert 300 includes an opening 314 in a bottom of the insert 300 to provide a drain from the recess. In an example embodiment, the hinge 312 is also provided along the bottom of the insert 300 and the bottom of the insert 300 is proximate to the bottom 111 of the housing 101 when the insert 300 is positioned in the slot 104. The opening 314 advantageously provides a means to drain oil, grease and other such products produced during the heating of the food in the recess 300. In an example embodiment, these drained products flow into the drip tray 110 that can be easily removed from a slot within the housing 101 and emptied and/or cleaned before replacing the drip tray 110 back into the slot.

FIG. 1B is an image that illustrates an example of sectional view of the system for heating food of FIG. 1A with an insert 302 within the slot 104, according to an embodiment. In embodiment, the insert 302 includes two semi-circular shaped elements 310 with the hinge 312 positioned between the two semi-circular shaped elements 310 to define a semi-circular shaped recess between the elements 310 in the closed position. In an embodiment, insert 302 also features an opening 330 to provide food (e.g. pour scrambled egg mix, such as obtained using the container 132 and rotor 130) into the recess when the insert 302 is in the closed position. In an example embodiment, the insert 302 is configured to cook an omelet when placed in the slot 104 and the system 100 is activated. In an example embodiment, the switch 108 is set to an appropriate time and temperature setting (or buttons 108c-108d are used to select the appropriate cooking mode) for an omelet before the lever 106 is pulled (or button 108c is pushed to activate the heating, e.g. where no movable platform/lever are provided) after the insert 302 is positioned in the slot 104 and the recess of the insert 302 is filled with the scrambled egg mix for the omelet.

FIG. 1C is an image that illustrates an example of sectional view of the system for heating food of FIG. 1A with an insert 304 within the slot 104, according to an embodiment. In embodiment, the insert 304 includes two circular shaped elements 310 with the hinge 312 positioned between the two circular shaped elements 310 to define a circular shaped recess between the elements 310 in the closed position. In an embodiment, insert 304 also features an opening 330 to provide food (e.g. pour cake batter) into the recess when the insert 304 is in the closed position. In an example embodiment, the insert 304 is configured to bake a cake when placed in the slot 104 and the system 100 is activated. In an example embodiment, the switch 108 is set to an appropriate time and temperature setting for a cake before the lever 106 is pulled after the insert 304 is positioned in the slot 104 and the recess of the insert 304 is filled with the cake batter for the cake. In another example embodiment, the buttons 108c and indicators 108d are utilized to select the appropriate cooking mode (e.g. baking) and no levers are provided.

Figure 3E:
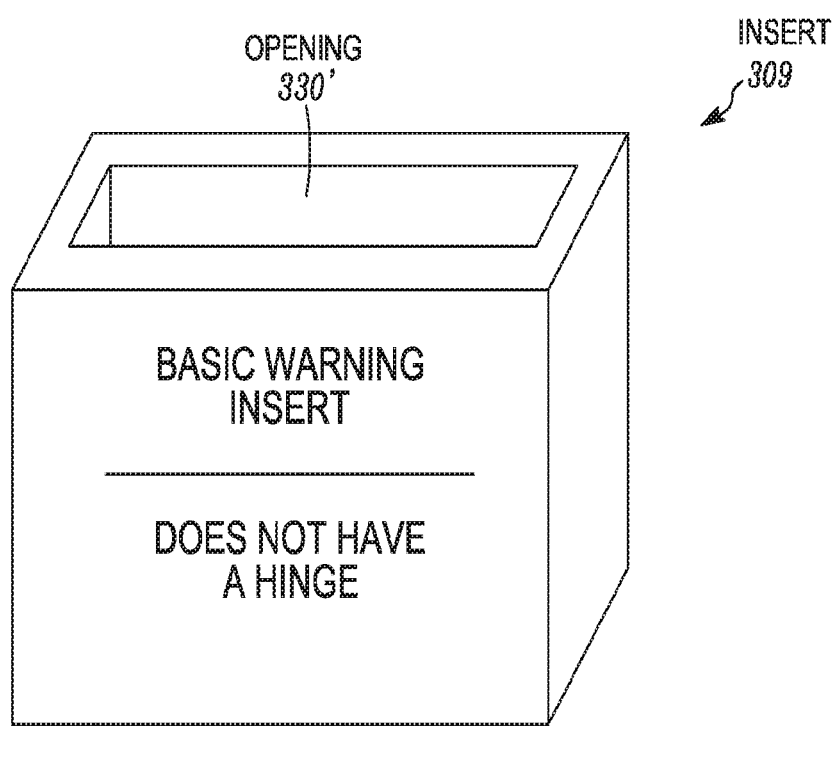
FIG. 3E is an image that illustrates an example of a side perspective view of a sixth insert to be used in the system of FIG. 1A, according to an embodiment.
Figure 3F:
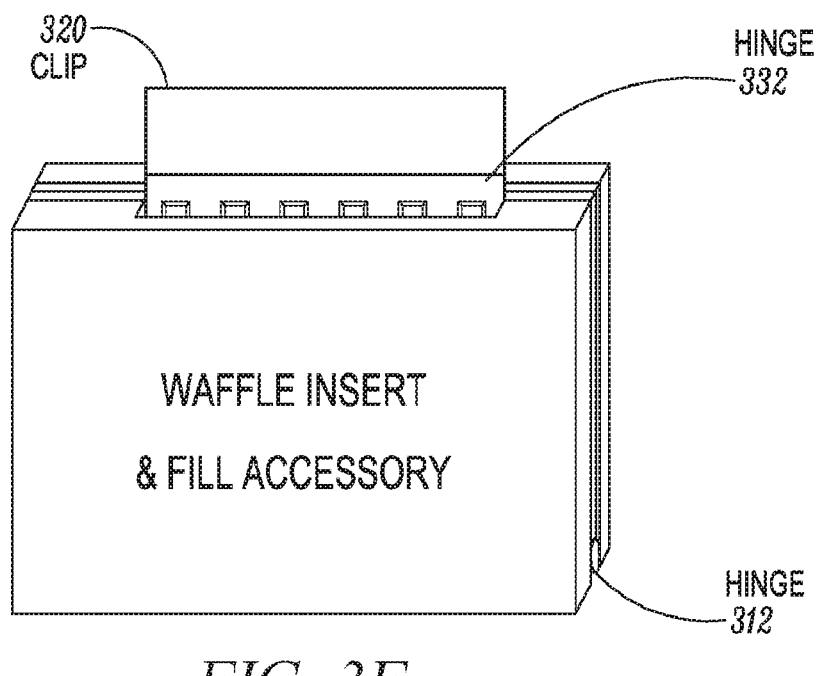
FIG. 3F is an image that illustrates an example of a side perspective view of the fourth insert to be used in the system of FIG. 1A, according to an embodiment.
Figure 3G:
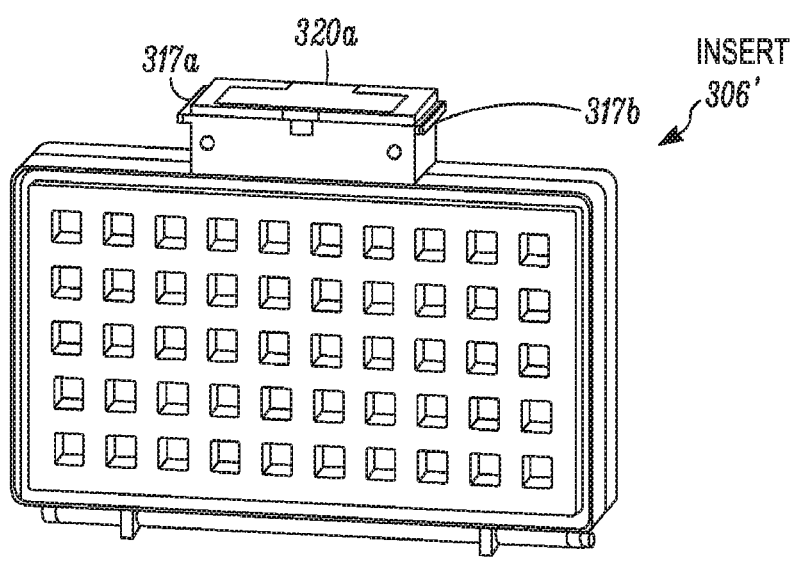
FIG. 3G is an image that illustrates an example of a side view of the fourth insert of FIG. 3B, according to an embodiment.
Figure 3H:
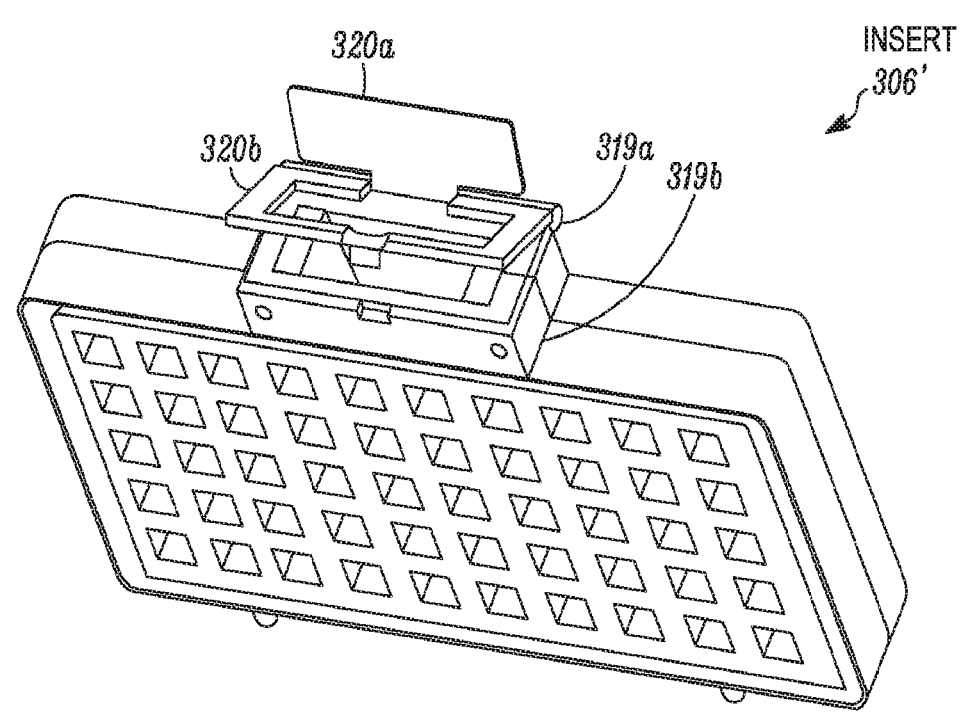
FIG. 3H is an image that illustrates an example of a top perspective view of the fourth insert of FIG. 3B, according to an embodiment.
Figure 31:
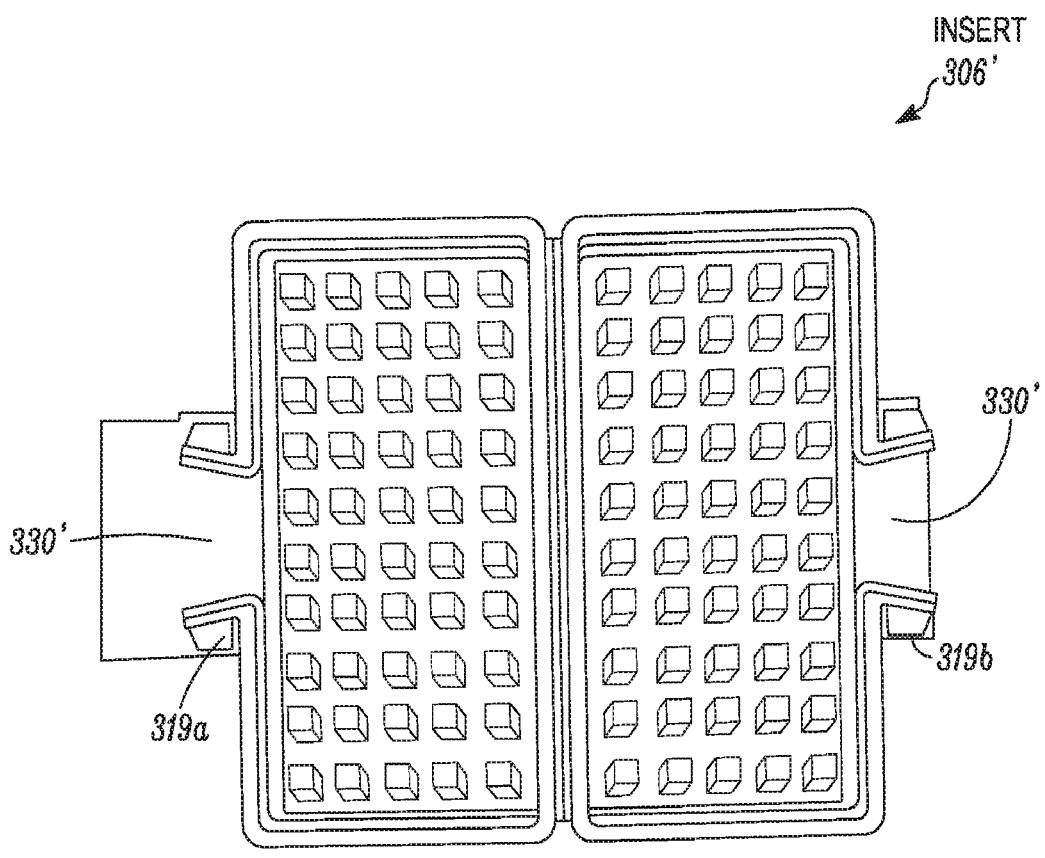
Figure 3J:
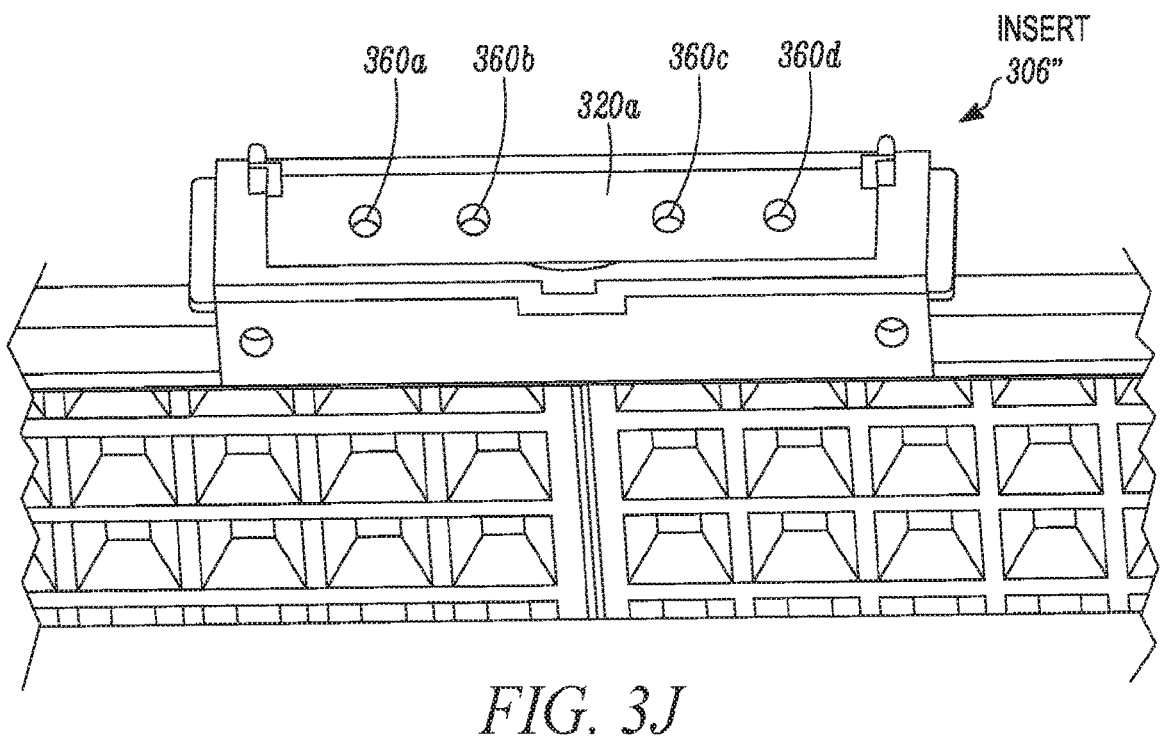
FIG. 3J is an image that illustrates an example of a top perspective view of the fourth insert of FIG. 3B, according to an embodiment.
Figure 3K:
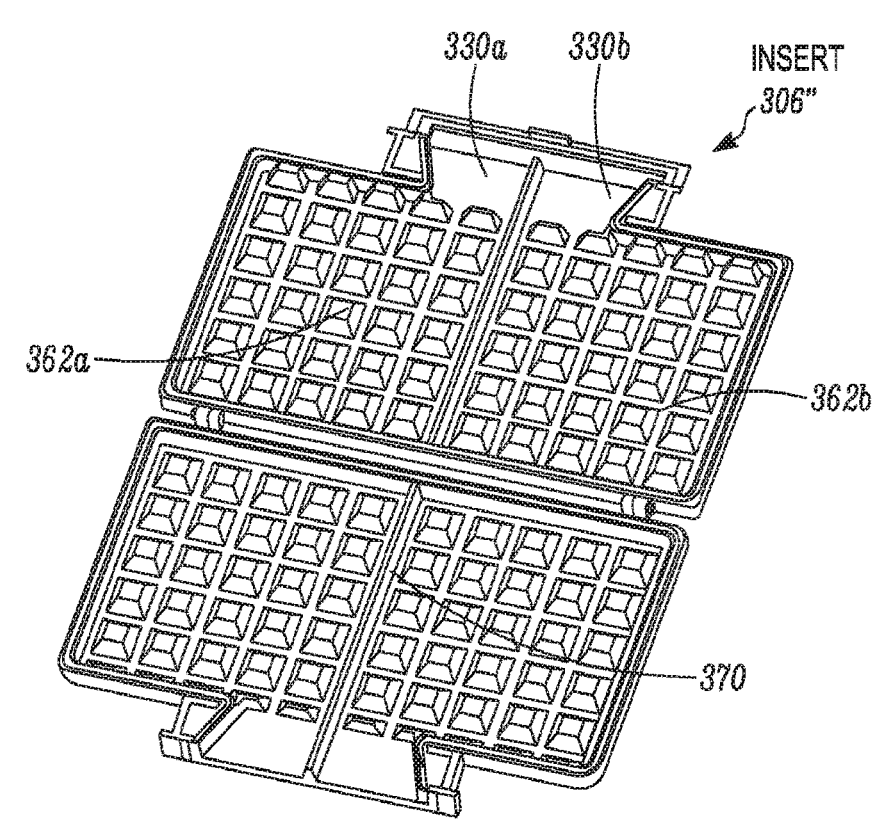
FIG. 3K is an image that illustrates an example of a top perspective view of the fourth insert of FIG. 3J in the open position, according to an embodiment.
Figure 3L:
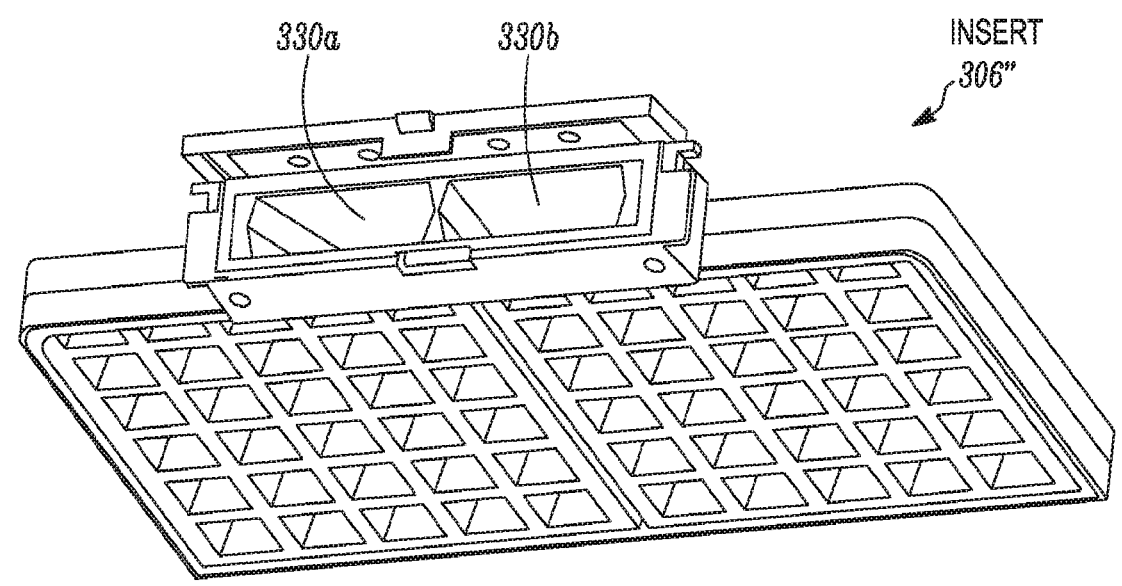
FIG. 3L is an image that illustrates an example of a top perspective view of the fourth insert of FIG. 3J with the clip in the open position, according to an embodiment.
Figure 3M:
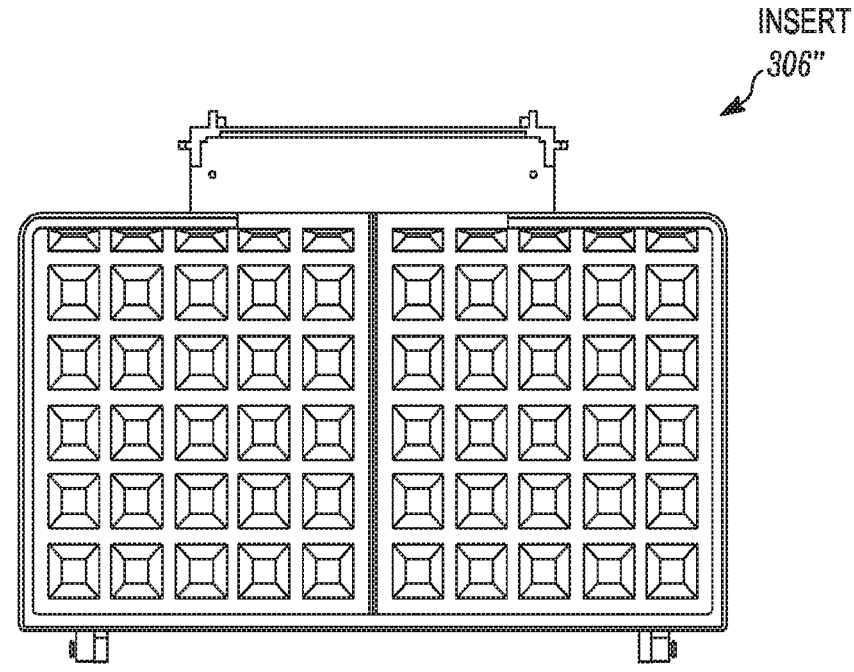
FIG. 3M is an image that illustrates an example of a side view of the fourth insert of FIG. 3J, according to an embodiment.
Figures 3N, 3O:
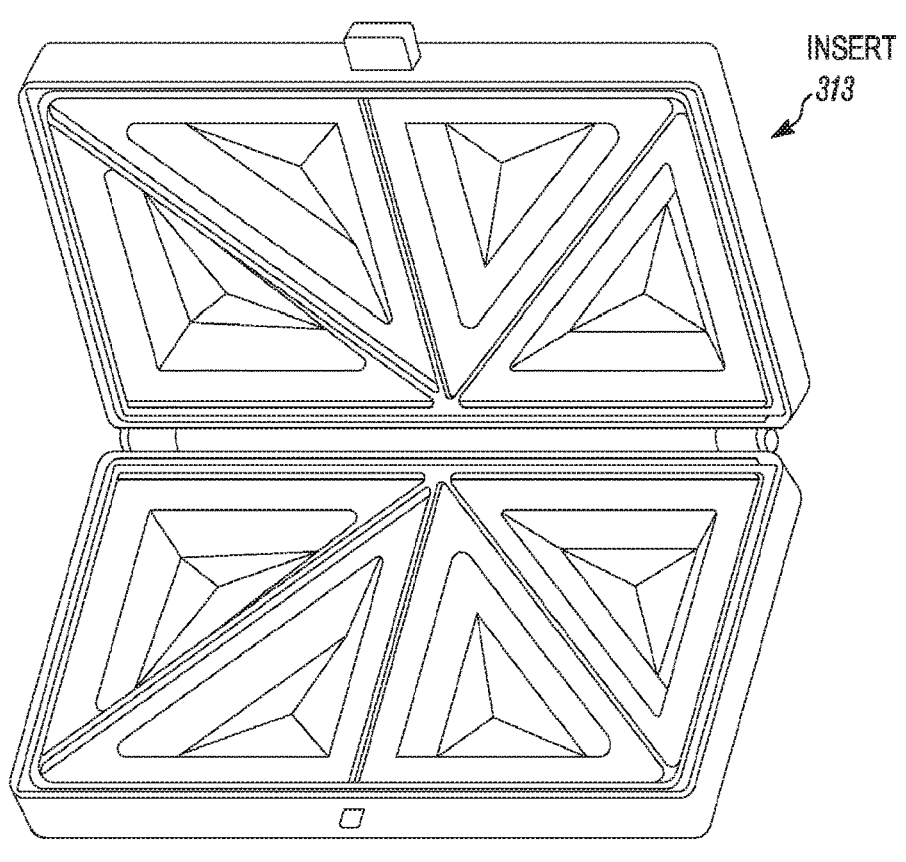
FIG. 3N is an image that illustrates an example of a side perspective view of an eighth insert to be used in the system of FIG. 1A, according to an embodiment.
FIG. 3O is an image that illustrates an example of a side perspective view of the third insert of FIG. 3A in an open position, according to an embodiment.

FIGS. 3A-3O are images that illustrate an example of an insert to be positioned within the slot 104, according to an embodiment. In embodiment, the insert includes include two rectangular shaped elements 310 with the hinge 312 positioned between the two rectangular shaped elements 310 to define a rectangular shaped recess between the elements 310 in the closed position. In an embodiment, the insert also features an opening 330 to provide food (e.g. waffle mix in FIG. 3B, 3F; food leftovers in FIG. 3E) into the recess when the insert is in the closed position. In another embodiment, the food is placed between the elements 310 of the insert in the open position (e.g. sandwich or chicken breast in FIG. 3A; hot dogs or sausages in FIG. 3C, etc.). In an example embodiment as depicted in FIG. 3C, the insert elements 310 feature partitions 326 along an inner surface of the elements that define partitioned regions 327 and discrete food segments can be positioned within each partitioned region 327 (e.g. hot dog, sausage, etc.). In another example embodiment, as depicted in FIG. 3B, a plurality of regular spaced protrusions 322 are provided along an inner surface of the elements 310 to form certain food (e.g. waffle). In another example embodiment, as depicted in FIG. 3A, a plurality of grooves 311 are provided along an inner surface of the elements 310 to minimize the surface area contact between the food and the elements 310 and thus to minimize the degree of sticking.

In yet another example embodiment, as illustrated in FIG. 3A a pair of extensions 316a, 316b made from thermally insulative material (e.g. silicon, rubber, etc.) are provided near a top of the insert and are used so that the user can grab the insert and remove it from the slot 104 after the lever 106 and movable platform move the insert up in the slot 104 at the end of the heating time. In other embodiments, the extensions 316a, 316b are used to remove the insert from the slot, where no levers or movable platform is provided. The extensions 316a, 316b can be utilized with any of the inserts disclosed herein. In an example embodiment, the switch 108 is set to an appropriate time and temperature setting based on the type of food within the insert recess, before the lever 106 is pulled after the insert is positioned in the slot 104 and the recess of the insert is filled with the food. In still other embodiments, the buttons 108c and light indicator 108d are used to select the appropriate cooking mode (e.g. and no levers are provided). In yet another example embodiment, the insert of FIG. 3E features an opening 330' that is larger than the opening 330 of FIG. 3D and/or does not feature a pair of elements 310 that are rotatable about a hinge 312. Instead, the insert of FIG. 3E is one-piece and/or has a fixed cross section and opening 330' that is used to provide a wide range of food (e.g. leftovers, vegetables, etc.) to reheat when the insert is placed in the slot 104 and the system 100 is activated. In some embodiments, the opening 330' has a clip to cover the opening 330' but in other embodiments no clip is provided and thus the opening 330' remains opening during the heating of the food in the slot 104.

In yet another example embodiment, as illustrated in FIGS. 3G-3H, in one embodiment the insert 306' includes secondary elements 319a, 319b that are respectively connected to the elements 310a, 310b such that the opening 330' is formed by the elements 310a, 310b and the secondary elements 319a, 319b when the elements 310a, 310b are moved to the closed position. In an embodiment, the clip 320 includes an outer clip 320b that pivots to a closed position to seal an outer portion of the opening 330' and an inner clip 320a that pivots to a closed position to seal an opening defined by the outer clip 320b. In another embodiment, the insert 306' includes a pair of flanges 317a, 317b (FIG. 3G) that are aligned about parallel with a top of the insert and/or extend at an angle (e.g. orthogonal) relative to the side of the insert. In an example embodiment, the secondary elements 319a-319b, the inner and outer clips 320a-320b and/or the flanges 317a, 317b are made from a similar material as the extensions 316 (e.g. silicon, rubber, etc.) that is thermally insulative. A distinct advantage of the flanges 317a, 317b is that the user can easily remove the insert from the slots 104 of the system 100 since the flanges 317a, 317b are a convenient pair of surfaces for the user to hold that will not have an elevated temperature. FIG. 3I also depicts that in one embodiment, the opening 330' defined by the elements 310a, 310b and/or the secondary elements 319a, 319b is tapered (e.g. widens) in a direction from a top of each element to a base of each element. This advantageously provides a larger (e.g. funnel shaped) opening at a top surface of the insert, to facilitate the user pouring and/or placing the ingredients within the opening 330' (e.g. without spilling).

In yet another example embodiment, inserts are provided that feature multiple recesses between the elements and/or multiple openings. One advantage of these inserts is that the user can simultaneously cook multiple portions of food (e.g. multiple waffles, multiple omelets, etc.) with one insert. Another advantage of these inserts is that the user can cook a smaller portion of food (e.g. smaller waffle using one of the multiple recesses of the insert) if the user doesn't need a larger portion of food (e.g. cooking multiple waffles using the multiple recesses of the insert).

FIGS. 3J through 3M are images that illustrates an example of various views of a fourth insert 306", according to an embodiment. In one embodiment, the fourth insert 306" is similar to the fourth insert 306' of FIGS. 3G through 3I, with the exception of the features discussed herein. In an embodiment, the insert 306" features a divider wall 370 (FIG. 3K) that divides the insert 306" into a first region 362a and a second region 362b. In this embodiment, upon moving the pair of elements 310a, 310b to the closed position, a first recess is defined by the first regions 362a of the pair of elements 310a, 310b and a second recess is defined by the second region 362b of the pair of elements 310b. This advantageously permits a user to cook multiple portions of food (e.g. multiple waffles, multiple omelets) in the multiple recesses. In yet another embodiment, the fourth insert 306" features multiple openings 330a, 330b (FIG. 3K). In an example embodiment, the first opening 330a is continuous with the first recess (e.g. defined by the first regions 362a of the elements 310a, 310b in the closed position) and the second opening 330b is continuous with the second recess (e.g. defined by the second regions 362b of the elements 310a, 310b in the closed position). In yet another embodiment, the inner clip 320a defines a plurality of openings 360a through 360d. The inventor recognized that these openings 360a through 360d advantageously facilitate venting of steam and heat during the heating of the food within the insert 306". Although four openings are depicted in FIG. 3J, in other embodiments less or more than four openings are provided. In an example embodiment, the diameter of the opening is sufficiently large to permit a threshold amount of heat and steam and is sufficiently small to sufficiently insulate the generated heat within the insert in order to facilitate the heating of the food within the recess.

In an embodiment, the system 100 as shown in FIG. 1A and FIG. 2 further includes a base 133 that also includes a secondary heating element 115 to heat contents of an accessory container 132 (e.g. cup, soup mug, etc.) and is communicatively coupled with the power source 204.

In an embodiment, a secondary thermostat or temperature sensor 114 is also provided and is communicatively coupled with the controller 202. In an embodiment, the accessory container 132 features a lid 112 to keep the contents of the accessory container 132 at a desired temperature. As further depicted in FIG. 1A, a panel is provided with a plurality of buttons 116a, 116b, 116c that indicate a plurality of operating modes of the torque base 133. In an embodiment, the torque base 133 includes a rotor 130 that is rotatably coupled to a rotary component (not shown) within the accessory container 132. In some embodiments, the rotor 130 is omitted. Thus, spinning of the rotor 130 causes the rotary component to spin within the accessory container 132 to mix or stir the contents of the container 132. In some embodiments, the base 133 is integral with the housing 101 and system 100. In other embodiments, the base 133 is omitted from the system 100. In still other embodiments, a sensor (not shown) is provided to detect whether or not the container 132 is mounted on the base 133 and in some embodiments the sensor transmits a signal to the controller 202 which is required before power can be transmitted to the heating element 115 and/or rotor 130. This advantageously provides a safety feature, e.g. to prevent someone placing their hand on the heating element 115 in the absence of the container 132 mounted on the base 133.

In an embodiment, a first button 116a indicates a first mode of operation of the torque base 133 such that upon pressing the first button 116a (e.g. and detection of a presence of a container on the base), the controller 202 causes the power source 204 to initiate rotation of the rotor 130 for a predetermined time (e.g. about 3 minutes or in a range from about 1 minute to about 5 minutes) but does not cause the power source 204 to send power to the heating element 115 to increase the temperature of the contents of the container 132. In an example embodiment, the first mode could be used to mix one or more ingredients to be placed in the inserts (e.g. cake batter, omelet mix, etc.)

In an embodiment, a second button 116b indicates a second mode of operation of the torque base 133 such that upon pressing the second button 116b (e.g. and detection of a presence of a container on the base), the controller 202 causes the power source 204 to initiate rotation of the rotor 130 for a predetermined time (e.g. about 5 minutes or in a range from about 1 minute to about 10 minutes) and to send power to the heating element 115 to increase the temperature of the contents of the container 132 until the temperature of the heating element 115 reaches a desired temperature (e.g. about 150 F or in a range from about 120 F to about 180 F). In this embodiment, the temperature sensor 114 transmits data indicating the temperature of the heating element 115 to the controller 202. Upon receiving data indicating that the temperature of the heating element 115 has reached the desired temperature and has remained at the desired temperature for the predetermined time, the controller 202 transmits a signal to the power source 204 to stop sending power to the heating element 115.

In an embodiment, a third button 116c indicates a third mode of operation of the torque base 133 such that upon pressing the third button 116b (e.g. and detection of a presence of a container on the base), the controller 202 causes the power source 204 to initiate rotation of the rotor 130 for a predetermined time (e.g. about 5 minutes or in a range from about 1 minutes to about 10 minutes) and to send power to the heating element 115 to increase the temperature of the contents of the container 132 until the temperature of the heating element 115 reaches a desired temperature (e.g. about 200 F or in a range from about 150 F to about 250 F). In this embodiment, the temperature sensor 114 transmits data indicating the temperature of the heating element 115 to the controller 202. Upon receiving data indicating that the temperature of the heating element 115 has reached the desired temperature and has remained at the desired temperature for the predetermined time, the controller 202 transmits a signal to the power source 204 to stop sending power to the heating element 115. In an example embodiment, the second or third mode could be used to prepare a side dish to compliment the food heated in the insert (e.g. soup, syrup, etc.). In yet further embodiments, the panel includes a button (not shown) that activates the secondary heating element 115 but not the rotor 130, such as when the user wants to heat the contents of the container but not mix the contents of the container (e.g. coffee pot shown in FIG. 1K, egg steamer container shown in FIG. 1L, etc.).

In an embodiment, various accessory containers are provided, to advantageously permit various other food types to be heated/cooked simultaneously with the food that is cooked within the inserts that are positioned within the slots of the system 100. FIG. 1H is an image that illustrates an example of a side view of a container 137 to steam eggs using the system 100 of FIG. 1A, according to an embodiment. As shown in FIG. 1H, the container 137 includes a pair of trays with a plurality (e.g. seven) of recesses to receive eggs and a dome portion that encloses the pair of trays such that heat and/or steam is circulated within the container 137 and hard boils the eggs positioned within both trays. In an example embodiment, water is placed in the bottom tray (e.g. in recesses formed in the bottom tray) and upon heating this water (e.g. with the heating element 115) steam is generated which rises within the dome, through openings defined by the upper tray and encloses eggs placed in the upper tray. This process continues for a predetermined time until the eggs are hardboiled. In an embodiment, the container 137 is sized to fit on the base 133 and to be heated by the secondary heating element 115.

FIG. 1I is an image that illustrates an example of a side view of a container 132 to mix ingredients (e.g. omelet ingredients, soup, syrup, etc.) within the container 132 by means of the rotor 130 of the system. In an embodiment, the contents of the container 132 can be mixed and heated by the base 133 of the system 100 (e.g. soup). In an embodiment, the container 132 is sized to fit on the base 133 and be heated by the secondary heating element 115. In this example embodiment, the base of the container 132 includes a first mating section (e.g. female) that is configured to engage a second mating section (e.g. male) that defines the rotor 130 of the base 133. Consequently, the rotor 130 is rotatably coupled with a second rotor (FIG. 1I) positioned within the container 132 and thus rotation of the rotor 130 causes the rotor within the container 132 to rotate, thereby mixing the contents of the container 132.

FIG. 1J is an image that illustrates an example of a side view of a container 135 to hold a steamed beverage (e.g. coffee, tea, etc.) using the system 100 of FIG. 1A, according to an embodiment. In an embodiment, the container 135 is a coffee pot (e.g. French press) that is sized to fit on the base 133 to be heated by the secondary heating element 115. In an example embodiment, the panel features a button which only causes the base 133 to heat the contents of the container 135 and not mix the contents of the container 135.

Figure 1K:
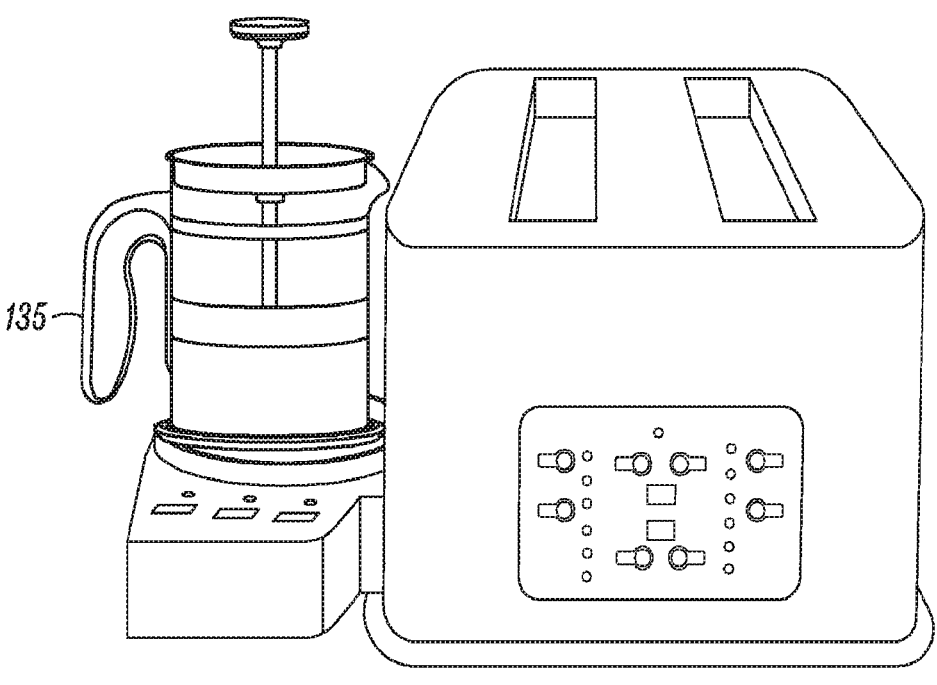
FIG. 1K is an image that illustrates an example of a side view of the system of FIG. 1A with a coffee pot heated by the secondary heating element, according to an embodiment.
Figure 1L:
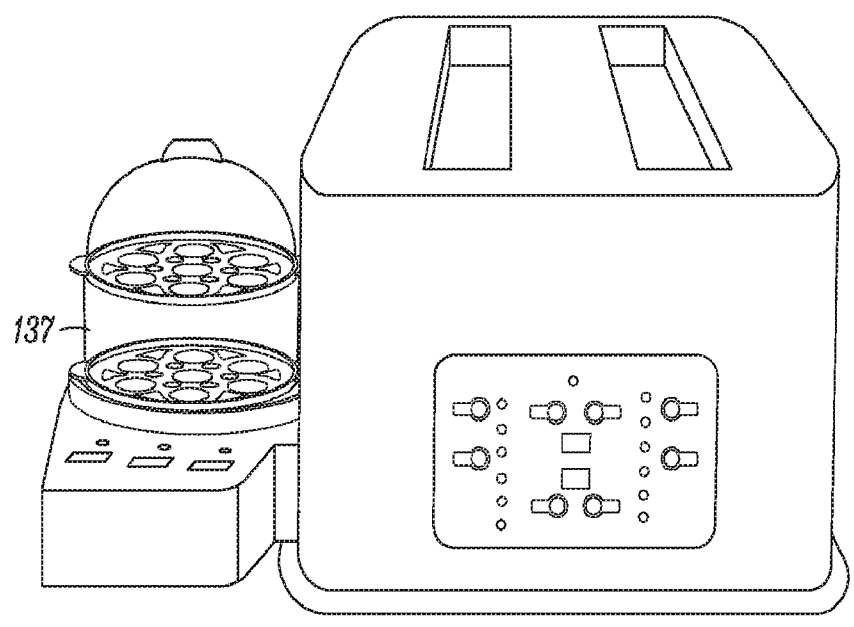
FIG. 1L is an image that illustrates an example of a side view of a system for heating food with an egg steamer container heated by the secondary heating element, according to an embodiment.

FIG. 1K is an image that illustrates an example of a side view of the system of FIG. 1A with the container 135 (e.g. coffee pot) heated by the secondary heating element 115, according to an embodiment. FIG. 1L is an image that illustrates an example of a side view of a system for heating food with the container 137 (e.g. egg steamer) heated by the secondary heating element 115, according to an embodiment.

Figure 4:
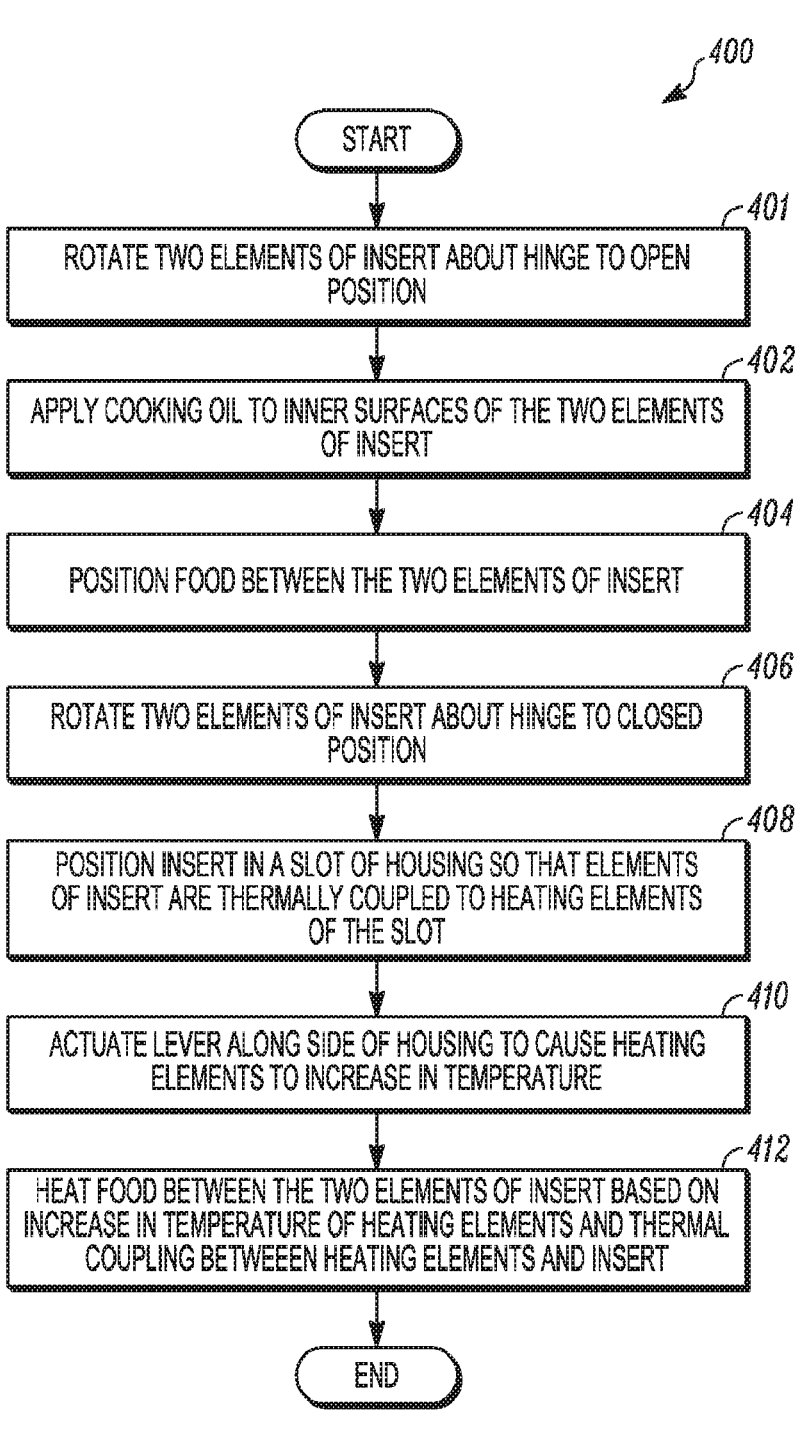
FIG. 4 is a flow chart that illustrates an example of a method for heating food using the system of FIG. 1A, according to an embodiment.

As depicted in FIG. 4, a flowchart is depicted that provides a method 400 for operating the system 100. Although the flowchart of FIG. 4 depicts particular steps in a particular order, in some embodiments the steps may be arranged in a different order and/or one or more steps may be omitted and/or additional steps may be included.

In an embodiment, step 401 involves the user rotating the elements of the insert about the hinge to an open position. In an embodiment, in step 401 the elements 310*a*, 310*b* (FIG. 3A) are rotated about the hinge 312 so the insert 300 is in an open position. In some embodiments, such as the insert in FIG. 3E, step 401 can be omitted since the elements of the insert need not be rotated to an open position. In some embodiments, in step 401 if the insert is in the closed position, step 401 may involve opening the inner clip 320*a* and/or outer clip 320*b* prior to rotating the elements 310*a*, 310*b* about the hinge 312 to open the insert 306' (FIGS. 3G-3H).

In an embodiment, step 403 involves applying a non-stick material (e.g. cooking oil) to the inner surfaces of the two elements of the insert. In an embodiment, in step 403 cooking oil is applied (e.g. sprayed) along the inner surfaces of the elements 310*a*, 310*b* (FIG. 3A) of the element. In other embodiments, step 403 is performed in a similar manner with respect to the inner surfaces of the insert 302, where the two semi-circular elements are rotated to the open position and the cooking oil is applied along the inner surface of the two semi-circular elements. In other embodiments, step 403 is performed in a similar manner with respect to the inner surfaces of the insert 304, where the two circular elements are rotated to the open position and the cooking oil is applied along the inner surface of the two circular elements. In other embodiments, step 403 is performed in a similar manner with respect to the inner surfaces of the insert 306, 308, 306', 306" where the two rectangular elements are rotated to the open position and the cooking oil is applied along the inner surface of the two rectangular elements.

In an embodiment, step 404 involves positioning food between the two elements of the insert. In an embodiment, in step 404 food is positioned between the two elements 310*a*, 310*b* of the insert 300 when the insert 300 is in the open position (e.g. sandwich, chicken breast in insert 300 or sausages/hot dogs in insert 308). In other embodiments, step 404 is performed by supplying food through the opening 330 (FIG. 3D) or opening 330' (FIGS. 3G-3I) or openings 330*a*, 330*b* of the insert when the insert is in the closed position (e.g. omelet or waffle mix poured through opening 330 in insert 302, cake batter poured through opening 330 in insert 304, waffle mix poured through opening 330 in insert 306 or 306' or 306", omelet mix or waffle mix through the opening 330' in insert 306', etc.).

In an embodiment, step 406 involves rotating the two elements of the insert to the closed position. In an embodiment, in step 406 the two elements 310*a*, 310*b* are rotated around hinge 312 so the insert 300 is in the closed position and this is performed after step 404 (e.g. insert 300 is closed after the sandwich, chicken breast is positioned in the insert 300 or insert 308 is closed after the sausages/hot dogs are positioned in the insert 308). In other embodiments, step 406 involves rotating the two elements 310*a*, 310*b* of the insert to the closed position and this is performed before step 404 (e.g. omelet mix poured through opening 330 in insert 302 after closing the insert 302, cake batter poured through opening 330 in insert 304 after closing the insert 304, waffle mix poured through opening 330 in insert 306 or 306' or 306" after closing the insert 306, omelet mix or waffle mix or cake batter poured through opening 330' in insert 306' after closing the insert 306', omelet mix or waffle pix poured through one or more of the openings 330*a*, 330*b* in the insert 306", etc.).

In an embodiment, step 408 involves positioning the insert in a slot 104 of the system 100 so that elements of the insert are thermally coupled to the heating elements of the slot. In embodiment, in step 408 the insert 300 is positioned in the slot 104 so that the two elements 310*a*, 310*b* are thermally coupled and/or thermally engaged with (e.g. make physical contact with or in sufficient close proximity to) the heating elements 206 on either side of the slot 104. In an embodiment, step 408 is performed in a similar manner for each insert. In some embodiments, steps 406 and 408 are performed prior to step 404 (e.g. the insert is closed and positioned in the slot 104 after which food is poured through the opening in the insert). In this embodiment, after step 404 the clip is moved to the closed position so that the insert is closed during the cooking process.

In an embodiment, step 410 involves actuating the lever 106 along the side 113 of the housing 101 to cause the heating elements 206 to increase in temperature. In other embodiments, step 410 is omitted where no lever 106 or movable platform is provided. In yet another embodiment, step 410 involves selecting an appropriate cooking mode based on the food type (e.g. using buttons 108*c* and light indicator 108*d*). In an embodiment, in step 410 the switch 108 is set to the appropriate time and temperature setting (or the appropriate cooking mode using the buttons 108*c* and light indicator 108*d*) based on the type of food within the insert. In one embodiment, in step 410 the switch 108 is set to a first time and temperature setting for a first type of food (e.g. sandwich) and/or to a second time and temperature setting for a second type of food (e.g. chicken breast, steak) and/or to a third time and temperature setting for a third type of food (e.g. omelet, cake). In an example embodiment, step 410 involves the user actuating the appropriate lever 106 based on the desired slot 104 where the insert is to be placed and/or using the switch 108 to select the appropriate time and temperature setting based on the type of food within the insert. In some embodiments, in step 410 the user places multiple inserts within multiple slots, in which case the user performs steps 401-408 for each insert and in step 410 the user selects the appropriate time and temperature setting for each switch 108*a*, 108*b* (or the appropriate cooking mode using the buttons 108*c* and light indicator 108*d*) corresponding to the respective slot 104*a*, 104*b* where the food is to be heated. In some embodiments, the slots 104 are sized so that multiple inserts can be placed within one slot 104.

In an embodiment, step 412 involves heating the food between the two elements of the insert based on an increase in temperature of the heating elements and thermal coupling between the heating elements and insert. As previously discussed, the heating elements 206 are positioned on opposite sides and define an inner surface of the slot 104. Additionally, as previously discussed, a width of the insert in the closed positioned is based on a width of the slot 104 such that an outer surface of the elements 310*a*, 310*b* thermally engage (e.g. via physical contact or sufficiently close proximity) the heating elements 206 on either side of the width of the slot 104. In an embodiment, the food within the insert is heated by the heating elements 206 until the controller 202 determines that the heating elements 206 reached the desired temperature for the desired time (e.g. based on the time and temperature setting or based on the selected cooking mode using buttons 108*c*-108*d*). In this embodiment, the controller 202 then transmits a signal to the power source 204 to turn off the heating elements 206. In another embodiment, the controller 202 sends another signal to the lever 106 to lift the movable platform so that the user can remove the insert from the slot 104 (e.g. using the flanges 317a, 317b). In yet another embodiment, the controller 202 sends a signal to a motor (not shown) to move the movable platform so that the user can remove the insert from the slot 104 (e.g. using the flanges 317a, 317b). In yet another example embodiment, the insert is lifted within the slot 104 by the user pressing one of the buttons on the panel after which the controller 202 transmits a signal to a motor (not shown) to lift the insert. In some embodiments, the system does not feature any means for lifting the insert within the slot and instead the user removes the insert from the slot (e.g. using the flanges 317a, 317b). In an example embodiment, the user can remove the insert from the slot 104 by holding the extensions 316a, 316b, (FIG. 3A) made from thermally insulative material. In an example embodiment, the user can then rotate the elements 310a, 310b of the insert to the open position and serve the food.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the items, elements or steps modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. An insert, comprising:
a pair of elements that are rotatable about a hinge from an open position to a closed position;
wherein the pair of elements are made from solid continuous material excluding openings across an external surface of the insert such that the insert in the closed position defines a recess to hold food and wherein a width of the insert in the closed position is based on a width of a slot in a heating device such that the external surface of the insert is configured to thermally engage heating elements of the heating device when placed in the slot;
wherein the hinge is along a bottom of the insert and wherein the insert in the closed position defines an opening along a top of the insert that is opposite from the bottom of the insert;
and wherein the insert further comprises a clip that is rotatable about a second hinge on the top of the insert such that the clip is rotatable from an open position where the opening is open to a closed position where the opening is closed.

2. The insert of claim 1, wherein the insert is made from non-stick thermally conductive material.

3. The insert of claim 2, wherein the insert is made stainless steel material.

4. The insert of claim 1, wherein the width of the insert in the closed position is based on the width of the slot in the heating device such that the insert in the closed position is configured to thermally engage the heating elements of the heating device when placed in the slot.

5. The insert of claim 1, wherein the insert defines the opening along the top and the recess between the pair of elements in the closed position such that the opening is continuous with the recess.

6. The insert of claim 1, further comprising a seal that extends around a perimeter of each of the pair of elements such that an air-tight seal is provided around the perimeter of the insert in the closed position.

7. The insert of claim 1, further comprising at least one flange that extends from the top of the insert in an orthogonal direction relative to opposing sides of the insert.

8. A system, comprising:
a first insert, comprising:
a pair of elements that are rotatable about a hinge from an open position to a closed position:
wherein the pair of elements of the first insert are made from solid continuous material excluding openings across an external surface of the first insert such that the first insert in the closed position defines a recess to hold a sandwich and/or meat and wherein a width of the first insert in the closed position is based on a width of at least one slot in a heating device such that the external surface of the first insert is configured to thermally engage a pair of heating elements of the heating device when placed in the at least one slot;
a second insert that is different from the first insert, said second insert comprising:
a pair of elements that are rotatable about a hinge from an open position to a closed position;
wherein the pair of elements of the second insert are made from solid continuous material excluding openings across an external surface of the second insert such that the second insert in the closed position defines a recess to hold food and wherein a width of the second insert in the closed position is based on the width of the at least one slot in the heating device such that the external surface of the second insert is configured to thermally engage the pair of heating elements of the heating device when placed in the at least one slot;
wherein the second insert in the closed position defines an opening in a top of the second insert opposite from a bottom of the second insert comprising the hinge, wherein the opening is configured to pour liquid and wherein an inner surface of each element of the pair of elements of the second insert comprises a plurality of regular spaced protrusions to form a waffle;
wherein the heating device comprises a housing with a top, a bottom, and a pair of opposite sides;
the at least one slot defined by the housing, said at least one slot extending in a direction from the top to the bottom;
the pair of heating elements adjacent the at least one slot; and
wherein the pair of heating elements are configured to thermally couple with the pair of elements of the first insert and the second insert upon placement of the first insert or the second insert in the at least one slot.

9. The system of claim 8, wherein the at least one slot comprises a pair of slots defined by the housing, wherein the pair of heating elements comprises a first pair of heating elements adjacent a first slot of the pair of slots and a second pair of heating elements adjacent a second slot of the pair of slots, and wherein a pair of levers are along one of the sides of the housing such that a first lever of the pair of levers is operatively connected to the first pair of heating elements and a second lever of the pair of levers is operatively connected to the second pair of heating elements.

10. The system of claim 9, wherein the first pair of heating elements and the second pair of heating elements include a shared heating element positioned between the first and second slots.

11. The system of claim 8, wherein the pair of heating elements are positioned on opposite sides of the at least one slot and wherein each heating element of the pair of heating elements comprises a heat source and a non-stick thermally conductive element with an inner surface thermally coupled with the heat source and an outer surface configured to thermally engage the pair of elements of the first insert or the second insert in the at least one slot.

12. The system of claim 8, further comprising at least one lever along one of the sides of the housing and a switch along the same side of the housing as the at least one lever, said switch configured to adjust a time and temperature setting among a plurality of time and temperature settings, wherein the time and temperature setting is selected based on the food within the recess of the first insert or the second insert.

13. The system of claim 8, wherein the pair of elements of the first insert and the second insert are comprised of nonstick thermally conductive material.

14. The system of claim 8, wherein the opening in the second insert is in an external surface of the top of the second insert that is continuous with the recess and wherein the top of the second insert is proximate to the top of the housing when the second insert is placed in the at least one slot.

15. The system of claim 14, wherein the second insert further comprising a clip that is rotatable about a second hinge at the external surface of the second insert, said clip being rotatable from an open position when the opening is open to a closed position when the opening is closed.

16. The system of claim 8, wherein the second insert comprises a seal around a perimeter of each of the pair of elements to provide an air-tight seal when the second insert is in the closed position.

17. A system, comprising:
an insert comprising;
a pair of elements that are rotatable about a hinge from an open position to a closed position;
wherein the pair of elements are made from solid continuous material across a width of the insert such that the insert in the closed position defines a recess to hold food and wherein the width of the insert in the closed position is based on a width of a slot in a heating device such that the insert in the closed position is configured to thermally engage a pair of heating elements of the heating device when placed in the slot
wherein the heating device comprises a housing with a top, a bottom, and a pair of opposite sides;
at least one slot defined by the housing, said at least one slot extending in a direction from the top to the bottom;
at least one lever along one of the sides of the housing and a switch along the same side of the housing as the at least one lever, said switch configured to adjust a time and temperature setting among a plurality of time and temperature settings, wherein the time and temperature setting is selected based on the food within the recess of the insert;
the pair of heating elements adjacent the at least one slot; and
a pair of temperature sensors configured to measure a temperature of the pair of heating elements;
a power source; and
a controller operatively coupled to the power source, the at least one lever, the switch, the temperature sensors and the pair of heating elements;
wherein the pair of heating elements are configured to thermally couple with the pair of elements of the insert upon placement of the insert in the at least one slot;
wherein said controller is configured to transmit a first signal to the power source based on receiving data from the at least one lever and switch indicating that the lever has been actuated and the time and temperature setting of the switch,
wherein said pair of heating elements are configured to increase in temperature to a first temperature upon the power source receiving the first signal;
wherein said temperature sensors are configured to transmit a second signal to the controller upon measuring that the temperature of the pair of heating elements is at the first temperature;
wherein upon receiving the second signal, said controller is configured to receive a third signal from the temperature sensors indicating the temperature of the pair of heating elements and configured to transmit the first signal to the power source to maintain the pair of heating elements at the first temperature for a first time period based on the time and temperature setting;
wherein upon determining that the pair of heating elements have maintained the first temperature for the first time period, the controller is configured to transmit a fourth signal to the lever and the pair of heating elements to raise the movable platform within the slot and deactivate the pair of heating elements.

18. A system, comprising:
an insert comprising;
a pair of elements that are rotatable about a hinge from an open position to a closed position;
wherein the pair of elements are made from solid continuous material across a width of the insert such that the insert in the closed position defines a recess to hold food and wherein the width of the insert in the closed position is based on a width of a slot in a heating device such that the insert in the closed position is configured to thermally engage a pair of heating elements of the heating device when placed in the slot
wherein the heating device comprises a housing with a top, a bottom, and a pair of opposite sides;
at least one slot defined by the housing, said at least one slot extending in a direction from the top to the bottom;
the pair of heating elements adjacent the at least one slot; and
wherein the pair of heating elements are configured to thermally couple with the pair elements of the insert upon placement of the insert in the at least one slot;
a rotor configured to engage a rotary component within a container;
a secondary heating element configured to heat the container placed on the secondary heating element;

a temperature sensor configured to measure a temperature of the secondary heating element;

a panel including a plurality of buttons indicating a respective plurality of modes;

a controller operatively connected to the secondary heating element, the rotor, the temperature sensor and the panel;

wherein the controller is configured to transmit a first signal to the rotor to cause the rotary component within the container to rotate at a first speed and to transmit a second signal to the secondary heating element to cause the secondary heating element to increase a temperature of contents of the container to a second temperature, wherein the first speed and second temperature are based on one of the plurality of modes in a signal received at the controller from the panel upon actuation of one of the plurality of buttons.

* * * * *